United States Patent [19]

Lindberg

[11] Patent Number: 4,476,817
[45] Date of Patent: Oct. 16, 1984

[54] COMBUSTION AND POLLUTION CONTROL SYSTEM

[75] Inventor: John E. Lindberg, Lafayette, Calif.

[73] Assignee: Owen, Wickersham & Erickson, P.C., San Francisco, Calif.

[21] Appl. No.: 513,991

[22] Filed: Jul. 14, 1983

Related U.S. Application Data

[60] Division of Ser. No. 190,932, Sep. 25, 1980, Pat. No. 4,393,817, which is a division of Ser. No. 657,747, Feb. 13, 1976, abandoned, which is a continuation-in-part of Ser. No. 613,867, Sep. 16, 1975, abandoned, which is a continuation-in-part of Ser. No. 356,589, May 3, 1973, abandoned, which is a continuation-in-part of Ser. No. 227,440, Feb. 18, 1972, abandoned.

[51] Int. Cl.³ .................. F02B 43/08; F02B 51/00; F02D 19/00; F02D 47/00
[52] U.S. Cl. .................. 123/3; 123/25 R; 123/25 B; 123/25 C; 123/25 P; 123/25 J; 123/25 K; 123/25 L; 123/536
[58] Field of Search .................. 123/25, 3, 536

[56] References Cited

U.S. PATENT DOCUMENTS

| | | | |
|---|---|---|---|
| 1,068,414 | 7/1913 | Courtenay | 123/25 P |
| 3,915,669 | 10/1975 | Minoza | 123/25 P |
| 4,030,453 | 6/1977 | Sugimoto | 123/25 P |
| 4,078,527 | 3/1978 | Yasuda | 123/25 P |
| 4,329,945 | 5/1982 | Beech et al. | 123/25 P |
| 4,337,731 | 7/1982 | Lohberg | 123/25 P |
| 4,393,817 | 7/1983 | Lindberg | 123/3 |

Primary Examiner—Wendell E. Burns
Attorney, Agent, or Firm—Owen, Wickersham & Erickson

[57] ABSTRACT

A controlled amount of a fluid (steam or water or a solution of water plus additives) is injected into an internal combustion engine to improve combustion, efficiency, and to reduce emissions. The amount of the fluid injected is controlled in response to engine need. The steam is generated by the heat produced by the engine. Combustion gas temperature is used to control the amount of steam produced by varying the fluid flow through one or more fixed or variable orifice control valves. The steam is injected in a piston engine to cool peak temperatures, to prevent detonation and pre-ignition, to smooth out hot spots, to prevent auto-ignition or dieseling, and to use the vapor energy in the expansion cycle to increase low speed torque and acceleration. The steam is used to cause full retard of the vacuum spark advance during acceleration at full load from low speed, and a large amount of steam is injected at this point in the cycle to prevent pre-ignition and detonation. Ultrasonic energy is added to the injected steam to produce better mixing and distribution. Hydrogen is also injected to permit better combustion with higher amounts of air. The hydrogen is produced by the interaction of a catalyst on the steam and fuel hydrocarbons and ultrasonic energy. At times exhaust gas and other additives, such as hydrogen peroxide, methyl alcohol and ammonia are injected.

9 Claims, 29 Drawing Figures

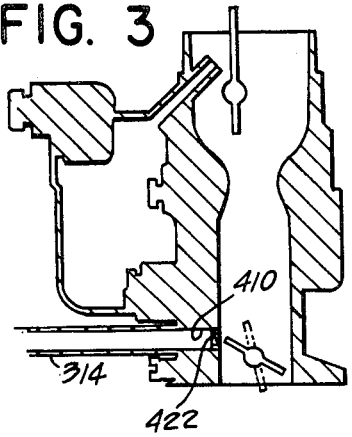
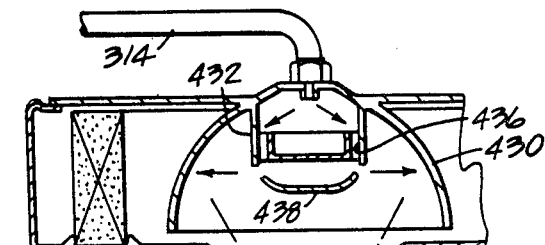
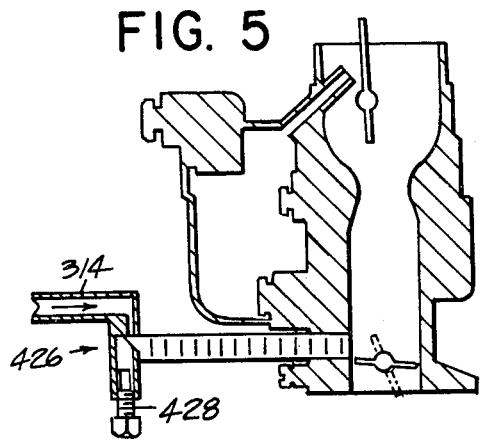
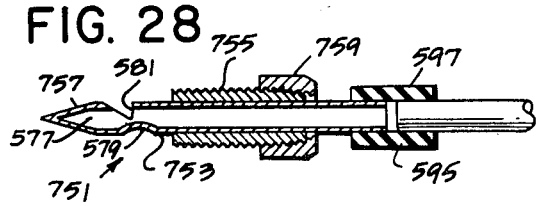
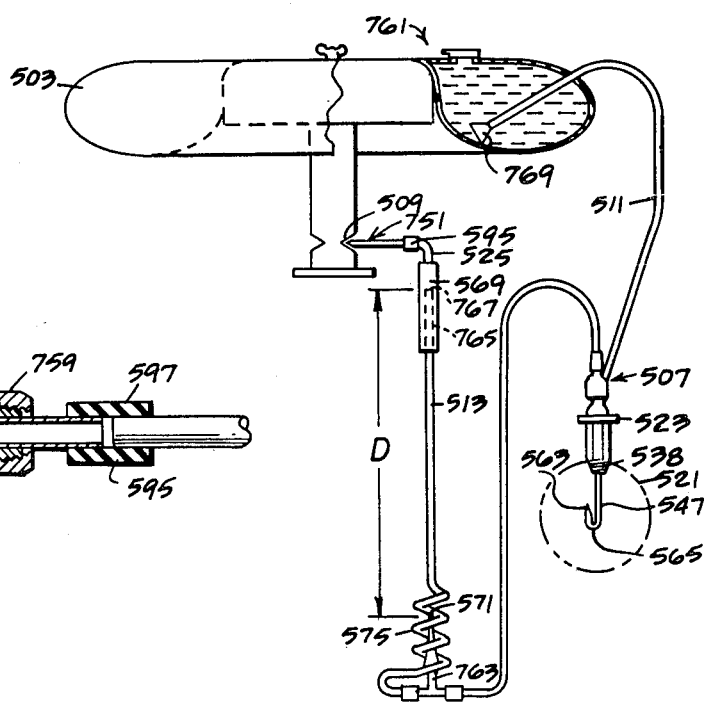

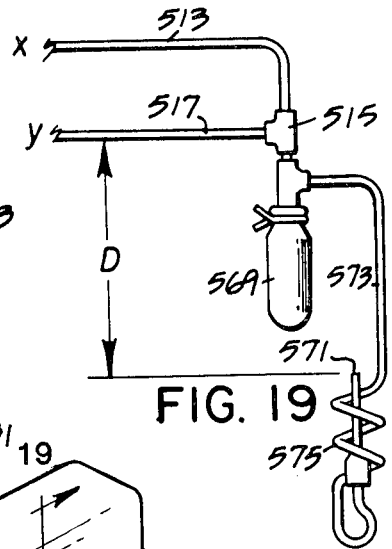
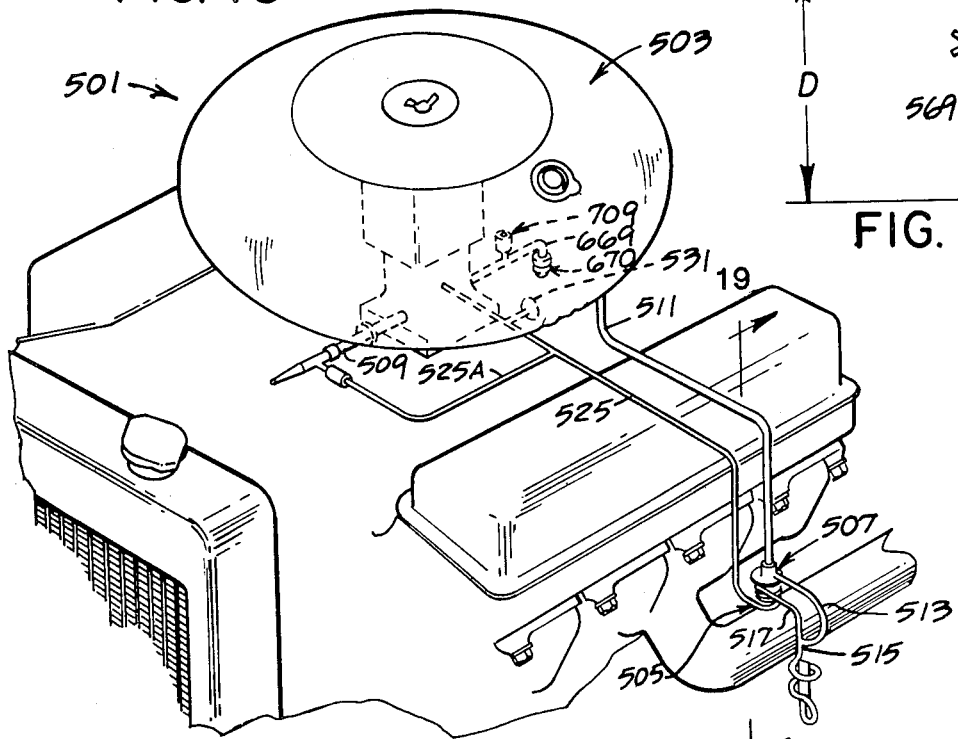
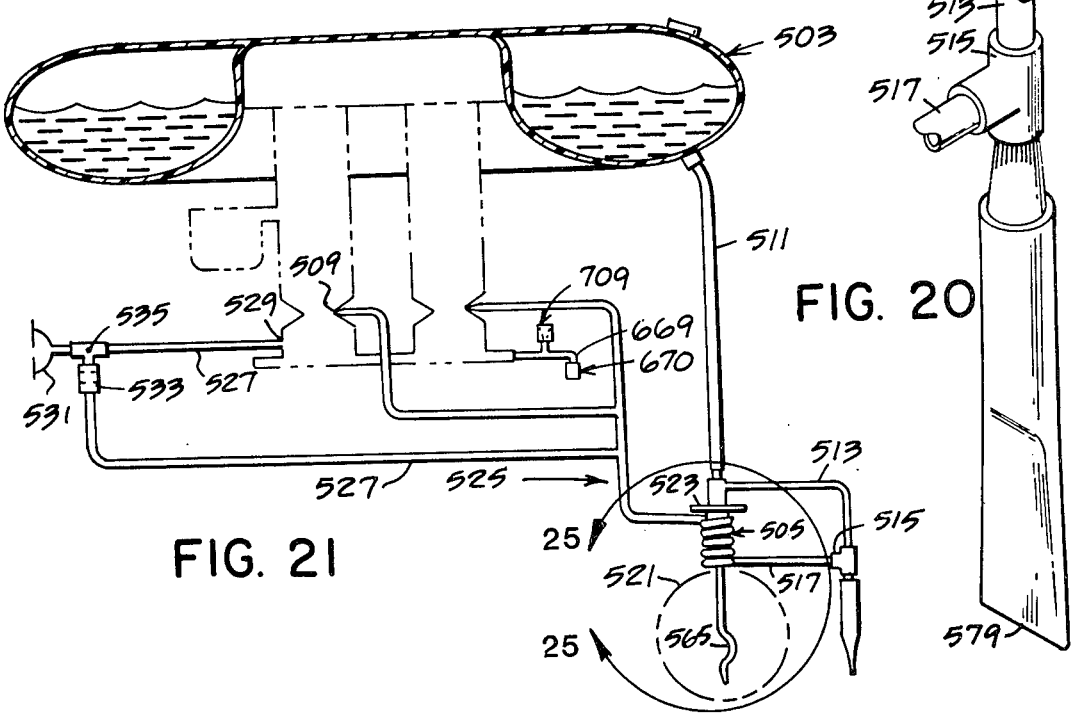

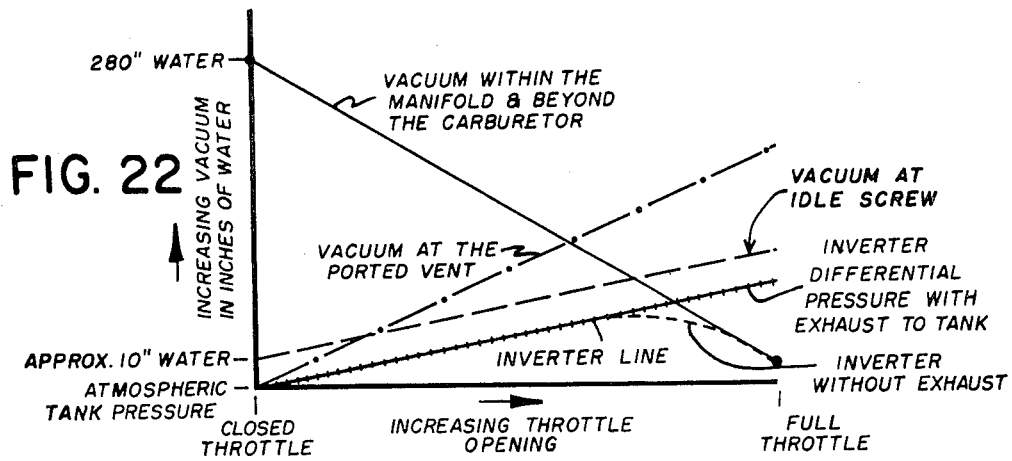
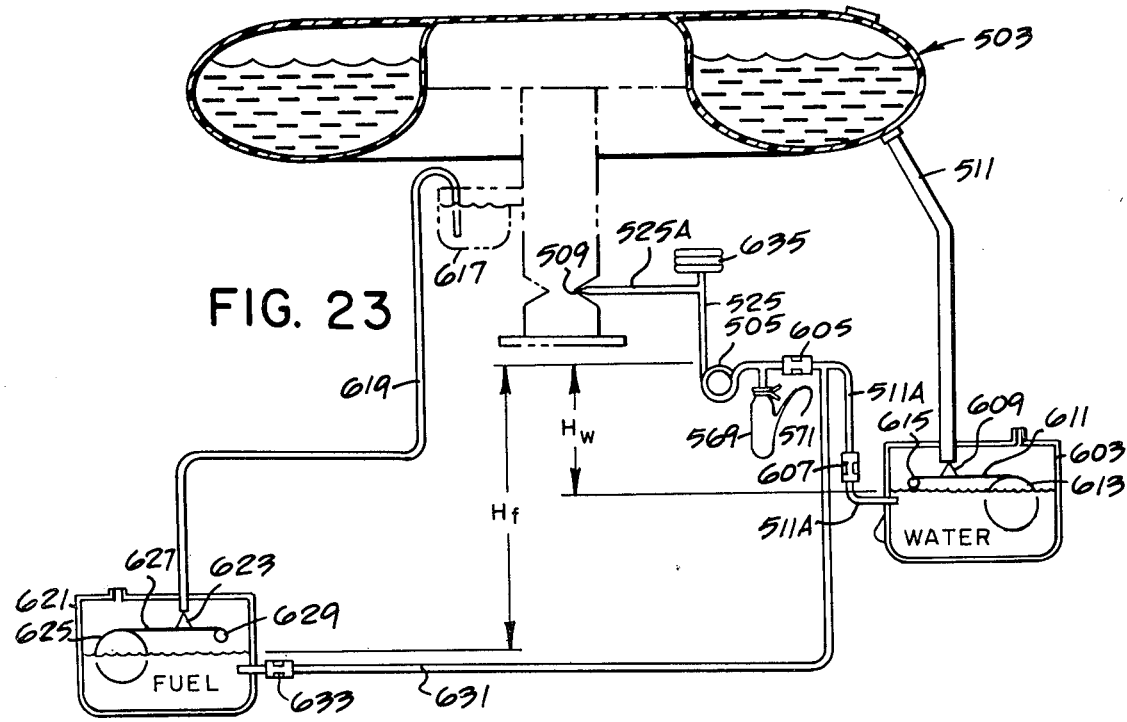
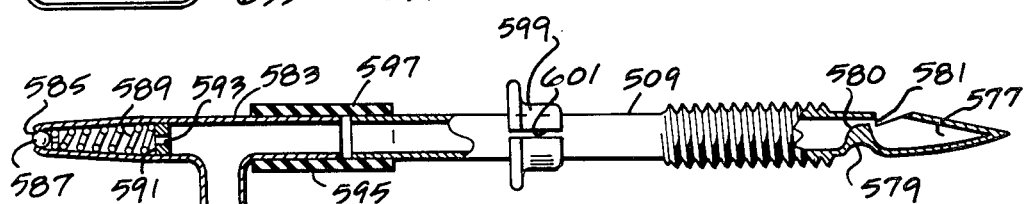

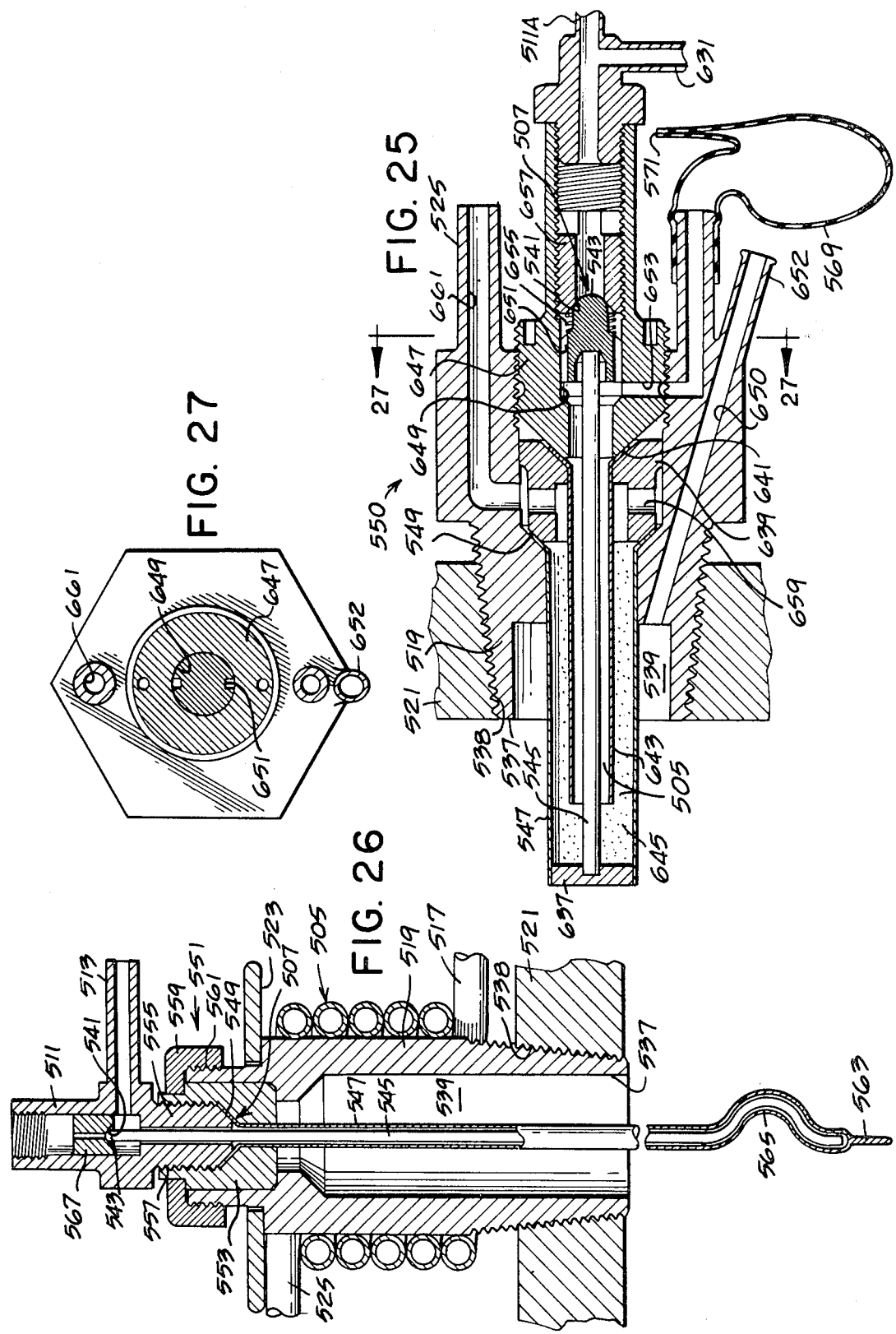

COMBUSTION AND POLLUTION CONTROL SYSTEM

This application is a division of application Ser. No. 190,932, filed Sept. 25, 1980, now U.S. Pat. No. 4,393,817 which was a division of application Ser. No. 657,747, filed Feb. 13, 1976, now abandoned which was a continuation-in-part of application Ser. No. 613,867 filed Sept. 16, 1975 now abandoned which was a continuation-in-part of application Ser. No. 356,589 filed May 3, 1973 now abandoned which in turn was a continuation-in-part of application Ser. No. 227,440 filed Feb. 18, 1972 now abandoned.

BACKGROUND OF THE INVENTION

The problem of pollution from automobiles is now very well recognized, and national, state and local laws have been passed requiring corrections. Attempts at solving the problem of pollution by cars have steadily been accompanied by decreasing the performance of the vehicle, making it harder to start and hard to stop when ignition is turned off due to auto-ignition, more critical to keep in adjustment and less drivable, less powerful, and less economical. A vast amount of money has been spent in many, many projects by the automobile companies and others, but the automobile companies are having great difficulties finding solutions that can meet the requirements established by the laws. Considerable work has been done on catalytic converters in the exhaust system but it all shows that to date there is no successful catalytic material that has reasonable life which can exist without eliminating the lead in the fuel. It therefore becomes an essential ingredient of any catalytic system that is to be successful that it must first of all eliminate the lead from the fuel. Even a small amount of lead has a very serious effect upon the life of the catalytic converter. Past solutions to this problem of emission control are also in general very expensive and generally do not lend themselves to application to already existent cars in the field. Another problem common with present cars is their tendency to pre-ignite and to afterfire when the ignition is cut off. They continue to cycle, which is called auto-ignition or dieseling. This is caused by a local hot spot in the combustion chamber which is hot enough to cause ignition of the fuel-air mixture and in advanced state is moving steadily ahead in ignition cycle after cycle, getting the combustion chamber hotter and hotter. When present high compression ratio engines with high spark advance used are used with no lead low octane fuel, they invariably go into a condition of pre-ignition or auto-ignition within their operating cycle. In an attempt to eliminate this problem, spark advance is normally retarded very severely and in new engines the cylinders and/or pistons are changed to lower compression ratio from 10.5 to approximately 8 to 8.5. These both seriously hurt combustion efficiency and so increase exhaust emissions, carbon monoxide and unburned hydrocarbons, making them much worse, and also seriously hurt economy and engine performance. Solutions proposed so far do not lend themselves to application to already existent vehicles in the field. This is a serious problem as any successful solution to the problem must cope with the very large number of cars already existent in the field and do so easily. In California laws have been passed requiring an emission control device to be applied to all 1955 to 1970 cars.

It has previously been proposed to inject water and steam into the induction systems of reciprocating piston internal combustion engines.

The prior art proposals for the injection of water or stream can be dividable primarily into two areas. The water or steam was injected either directly into the vacuum in the inlet manifold or was injected as a part of the throttle linkage speed control. In either case the prior art fluid injection systems did not produce the injection of sufficient amounts of fluid over the full engine operating range and/or gave excessive amounts under some conditions and did not supply fluid as needed.

In the vacuum control system the fluid was not injected in correct amounts at idle (normally being too much) and at full load was quite insufficient.

In both the former vacuum control and the throttle linkage control systems little or no fluid was injected during acceleration at full throttle under full load from low speed. This is precisely the time when the maximum amount of fluid injection is needed.

SUMMARY OF THE INVENTION

The present invention solves these problems by use of injection of properly controlled amounts, relating to operating mode, of steam plus at times hot exhaust gas, air, hydrogen and additives such as hydrogen peroxide, methyl alcohol or ammonia into, preferably, an inlet point that increases its vacuum with increasing engine power, such as the idle screw and/or the ported vent of the carburetor or it can be injected by an inverter into the PCV port or by separate adapter plate below the carburetor and thereby into the combustion chamber. This keeps the PCV system, ports, and combustion chambers clean and provides a cylinder charge of increased heat capacity and higher specific heat per cycle to increase internal cooling of hot spots within the combustion chamber cycle, to lower peak temperature, to prevent detonation, hot spot pre-ignition, and nitrous oxide (NOx) formation (formed above approximately 3400° F.) and to use the vapor energy of steam expansion to increase the torque, acceleration and efficiency. As shown in Table I, below the specific heat Cp for steam increases rapidly with temperature.

At 2000 K. (absolute) the Cp for $H_2O$ = 14.9

$NH_3$ ammonia = 29.84

Other gases in the cylinder combustion process are:

| | |
|---|---|
| $O_2$ | 8.5 |
| $N_2$ | 8.5 |
| NO | 8.5 |
| CO | 8.5 |
| $CO_2$ | 13.78 |

Thus, steam and ammonia each provide remarkable internal cooling ability. As noted by the formula in Table I, both ammonia and steam continue to increase Cp as the square of absolute temperature increases and so are very effective in snubbing peak damaging temperatures. The data given is for moderate pressure. At high pressure the heat capacities become appreciably greater. $H_2O_2$ (not shown) also provides high specific heat.

This system provides for increased quantity of high specific heat vapor to be added as the engine (or, broadly, as the combustion cycle process) requires it due to temperature and/or load. This disclosed system is applicable to all combustion processes (to increase efficiency and reduce thermal and mechanical stress and emissions): in internal combustion engines such as the 5 cycle reciprocating engine (as has been discussed); in internal combustion rotary engines as the Wankle, to provide very much needed internal cooling, to protect the critical rotor seals, to increase economy by operation at a near best F/A ratio, to obtain clean and complete combustion (present operation of these engines is very rich to obtain fuel cooling to protect rotor seals, but this gives very poor economy and emissions of hydrocarbons and carbon monoxide are very high and require a substantial thermal or catalytic reactor to reduce to even today's emission requirements); in turbine and jet engines, to improve combustion efficiency and reduce critically high temperatures, as of the turbine blades, to increase safety and reliability, reduce maintenance, and reduce production costs and emissions; external combustion engines such as steam engines and Sterling engines, and any heating boiler or heating furnace to improve combustion efficiency, reduce emission pollutants, and reduce critical burner part temperatures to obtain extended life.

The amount of vapor injected at high temperature at the input to cycle raises the vapor transition point that will occur during the exhaust cycle so that a condition can be obtained to recover part or all of the energy of vaporization (condensation) within the working cycle to increase further the efficiency and not throw this energy away in the exhaust.

TABLE I

| Gas | Empirical Equation | $C_p$ at 2000° K. abs |
|---|---|---|
| Monatomic | $C_p = 5.0$ | 5.0 |
| $H_2$ | $C_p = 6.5 + 0.0009T$ | 8.3 |
| $O_2, N_2, NO,$ CO, HCl, HBr, HI | $C_p = 6.5 + 0.0010T$ | 8.5 |
| $Cl_2, Br_2, I_2$ | $C_p = 7.4 + 0.001T$ | 9.4 |
| $H_2O, H_2S$ | $C_p = 8.81 - 0.0019 + 0.00000222T^2$ | 14.9 |
| $CO_2, SO_2$ | $C_p = 7.0 + 0.0071T - 0.00000186T^2$ | 13.76 |
| $NH_3$ | $C_p = 8.04 + 0.0007T + 0.0000051T^2$ | 29.84 |
| $CH_4$ | $C_p = 7.5 + 0.005T$ | 17.5 |

Since the energy used to vaporize the fluid is waste energy at the exhaust any recovery of heat of vaporization provides substantial further efficiency increase.

We are by the above substantially cooling the exhaust. At the limit, greatest efficiency will be obtained by exposing the flash boiler to waste heat at critical temperature points of the combustion chamber, while the exhaust valve seat insert, the spark plug insert or a special flash boiler plug with flash boiler exposed at the combustion chamber inner surface (said plug located near or at the combustion chamber critical temperature area), act as a coolant, as well as provide more heat for the flash boiler. A heat pipe, as discussed later, could provide the access to this heat and provide maximum heat for the thermal-catalytic reactor when used.

The emissions are decreased because the turbulence and the high energy and specific heat of the steam and exhaust added to the engine cycle provide excellent vaporization of the fuel and distribution of fuel vapor, air, exhaust gas, and steam. Also, the specific energy of the combustion cycle is increased to give more efficient and complete combustion. The steam acts to internally heat the combustion at start-up and then as temperature rises acts as an internal coolant, to lower peak surface temperatures and combustion peak temperature.

Detonation and preignition are also prevented. This more perfect combustion accounts for the decreased CO and HC emissions. The formation of NOx is prevented by the steam and exhaust gas keeping combustion temperature below the formation temperature of NOx (approximately 3400° F.). Because combustion is smoother the engine runs smoother and bearing loads are decreased.

It is recognized that exhaust gas recirculation as a method of nitrogen oxide control in internal combustion engines was tested by R. Kopa and A. Kimura at UCLA in 1960. To date attempts to use exhaust gas recirculation have suffered from problems of drivability and of rapid deposit build-up in the intake system.

I have invented a system to improve internal combustion engine performance and emission control using steam, and have tested and perfected it over the past several years. It uniquely combines in a control system superheated steam, air, and recirculated exhaust gas with the fuel-air mixture in the induction system as above described. I have, in fact, been using it in my Lincoln Continental Mark III '69 for approximately 6 years with no lead 91 octane fuel with excellent results, and have substantially solved the emission problem to the point of meeting standards years ahead.

The disclosed system increases the engine efficiency. This increase in efficiency is in part due to the increase in the average temperature of the combustion cycle. Engine efficiency increases as the temperature of the working fluid. Therefore, anything that can be done to raise the temperature of the steam that is put in the engine will raise the efficiency of the engine for the normally anticipated amount of steam to be used in the cycle (30% steam by weight of fuel used). If the steam in temperature is 1550° F. and the steam out temperature is 550° F. an over 11% increase in cycle efficiency occurs. It is proposed, therefore, that in new design the flash boiler be arranged to have access to the full combustion temperature at the surface of the combustion chamber. A flash boiler tube could be placed in a thermoplug having its surface on the surface of the inside of the combustion chamber. Alternately, it could be provided in the design to have it as a part of the exhaust valve seat to thereby provide cooling of the exhaust valve seat at the same time it picked up desired extra high inside combustion chamber temperatures. As an alternate to this, a heat pipe could be placed around the seat of the exhaust valve or in a part as described before to the inside combustion chamber surface and the extension of this heat pipe could be used to heat the flash boiler. The heat pipe was first put forward in 1942 by Richard S. Gaugler of General Motors Corporation and more recently put to work by George M. Grover of the Los Alamos Scientific Laboratory. The heat pipe is essentially a closed evacuated chamber whose inside walls are lined with a capillary structure or wick that is saturated with a volatile fluid. The operation of the heat pipe combines two familiar principles of physics: vapor heat transfer and capillary action. Vapor heat transfer is responsible for the transporting of the heat energy from the evaporator section at one end of the pipe to the condenser section at the other end. The heat pipe capillary action is responsible for the returning the condensed or heat fluid back to the evaporator section to complete the cycle. Current development of the heat pipe was described in May 1968 in Scientific American. It is also proposed to use this heat pipe action to carry heat down into the working area of our thermal and catalytic reactor within the exhaust manifold and down at the gasket section between the exhaust manifold and the exhaust pipe. This is necessary to give the required high temperature and the required residence time in flight at high temperature for completion of the combustion reaction.

In one specific embodiment of the present invention the water tank is mounted in the engine compartment above the engine to provide gravity feed. A maximum amount of gravity feed is obtained by placing the water tank high and by placing a flash boiler low in the engine compartment.

The flash boiler is heated by the exhaust gas, and the flow of water into the flash boiler is controlled by a variable orifice flow control valve in response to the exhaust gas temperature. As the temperature goes up, the valve opens to permit more water to flow into the flash boiler, and this produces more steam. Thus, the amount of steam injected is controlled in response to the engine's need for the steam.

Regulating the flow of the water, rather than the flow of the steam, simplifies the control and minimizes problems of high temperature corrosion.

Various constructions of the flash boiler can be used, depending on the installation and other factors.

Ultrasonic energy is added to the steam injected. The ultrasonic energy can be developed by the steam itself by passing the steam through whistles, or the ultrasonic energy can be developed by other means. The ultrasonic energy improves mixing and distribution.

The invention provides for the combination of steam, catalysts and ultrasonic energy with the fuel-air mixture to produce hydrogen gas. The hydrogen gas improves combustibility so that the engine can be operated on a leaner fuel-air ratio. The hydrogen also improves heat transfer and distribution.

The prior art proposals injected water or steam into a decreasing vacuum field (max vacuum at idle and min at full throttle). This is diametrically opposite to the desired condition which is to inject into a field where the vacuum increases from zero at idle to max at full throttle.

This ideal is approached with input through the idle screws. The small vacuum remaining at idle is made effectively zero by use of a standing column of water (equal to or slightly greater than the idle screw idle vac. in inches of water) connected at one end to the flash boiler input and at the other end to the fluidic drain valve. This system permits use of a common tube connection to a resilient collapsible wall accelerator-decelerator reservoir to add or remove water flow to the flash boiler to match engine need for quantity and quality of steam under dynamic change conditions.

The use of a decreasing vacuum field to produce an increasing vacuum input effect for the fluid is shown in the inverter system. The inverter provides the ideal zero vacuum at idle (so no fluidic drain column is required).

The vacuum continues to smoothly increase until full throttle is approached, where it drops off rapidly. This is corrected by applying above the water exhaust manifold total pressure either directly or through a low inertia fluidic valve to half wave rectify the alternating exhaust pressure and also applying this exhaust pressure to the inverter. This provides an increasing exhaust pressure (super atmospheric) over the water to correct for the vacuum decrease at full throttle noted above. The result is a steady increase in differential pressure of atmospheric total pressure over the tank water minus the total pressure at the fluid inlet point via the inverter which starts at zero at idle and which steadily increases with increasing power to max at full throttle. The inverter follows the power demand, giving zero flow at idle and steadily increasing fluid flow with increased power up to full throttle. On deceleration the fluid flow is fully cut off and any excess fluid is drained. On acceleration exhaust pressure over the top of tank fluid provides the extra fluid needed during acceleration. At engine off all fluid flow to the engine is instantly cut off, and drainage for any possible fluid in the engine fluid line is also provided. Air lean-out at engine cut-off is provided to aid in preventing dieseling (after-fire).

The inverter also provides air bleed lean-out proportioned to power to provide the additional air lean-out the engine is capable of using when operating with the described invention to give best economy and minimum emissions.

The fluid flow, in one specific embodiment of the present invention is controlled by a variable orifice valve responsive to heat flux produced by the engine so that an increase in heat flux results in an increase in the amount of fluid supplied to the engine. In this embodiment of the invention a very desirable control function is produced on an increase in heat flux because of a regenerative feedback resulting from an increase in the fluid flow. This regenerative effect is also effective on a decrease in heat flux to provide a rapid decrease in the fluid flow as a function of the decreasing fluid flow initially produced by the decreased heat flux. This heat flux fluid flow responsive system coacts with dynamic engine operating conditions to provide both a rapid control response and a response in the direction desired.

Other objects, advantages and features of my invention will become apparent from the following detailed description of one preferred embodiment taken with the accompanying drawings.

BRIEF DESCRIPTION OF THE DRAWINGS

In the drawings:

FIG. 3 is an elevation view in cross-section through a carburetor showing a conduit connection to the ported vent of the carburetor for injecting steam into the engine and having an orifice for producing shock waves in resonance in the injected steam to enhance intermixing of the steam, fuel, vapor and air inducted into the engine.

FIG. 4 is a view like FIG. 3 showing two different ways of injecting steam into the carburetor while producing resonant shock waves in the steam. FIG. 4 illustrates an electro mechanical resonance generator in the lower part of the figure for producing resonance in steam injected into the ported vent of the carburetor. FIG. 4 shows a whistle arrangement in the air filter housing for producing resonance in steam injected into the air filter housing. Further details of the whistle arrangement are shown in FIGS. 6 and 7.

FIG. 5 is a view like FIG. 3 showing a whistle connected in the steam inlet conduit for producing shock waves in the steam injected through the ported vent.

FIG. 8 shows an adjustable stop for setting the frequency of the whistle.

FIG. 18 is an isometric view of another embodiment of an emission control system constructed in accordance with the present invention. In the embodiment shown in FIG. 18 the steam is conducted to the engine through connections to both the idle adjustment screw of the carburetor and a connection to the ported vent of the carburetor.

FIG. 19 is an end elevation view taken generally along the line and in the direction indicated by the arrows 19—19 in FIG. 18, showing details of a flexible wall accumulator which is resilient so as to be collapsible proportional to engine vacuum and showing details of a fluidic control drain valve which can be incorporated in the FIG. 18 embodiment.

FIG. 20 is an isometric view showing a combined flexible wall accumulator and fluidic control drain valve (which can be used in place of the structure shown in FIG. 19) in the FIG. 18 embodiment of the emission control system.

FIG. 21 is an elevation view of the FIG. 18 embodiment (but showing a two-barreled carburetor in place of the single barreled carburetor of FIG. 18) and incorporating the combined accumulator and fluidic control drain valve structure of FIG. 20 rather than the structure shown in FIG. 19.

FIG. 22 is a diagram showing the manner in which the vacuums within the engine manifold, at the ported vent, at the idle screw and at the inverter respectively vary with changing throttle openings.

FIG. 23 is an elevation view like FIG. 21 but showing another embodiment of the present invention in which a regulated amount of fuel may be mixed with a regulated amount of water and is then heated within the flash boiler reactor to produce precombustion reactions of these two materials before they are introduced into the engine induction system at the idle adjustment screw. In the embodiment shown in FIG. 23 one of the precombustion reaction products is free hydrogen ahead of the cylinder when either fuel is mixed with the regulated amount of water or additives are added to the water tank.

FIG. 24 is a side-elevation view, partly in cross section to show details of construction, of one embodiment of an idle adjustment screw which incorporates a resonating chamber for producing ultrasonic injection of the materials introduced into the engine induction system through this idle adjustment screw. FIG. 24 also shows a variable orifice air bleed construction associated with the idle adjustment screw for introducing additional lean-out air if desired and in proportion to changing intake vacuum at the idle adjustment screw.

FIG. 25 is an elevation view in section of the flash boiler and water feed control to the flash boiler as shown encircled by the arrows 25—25 in FIG. 21.

FIG. 26 is an elevation view in cross section of a reactor which is particularly well adapted for incorporation in the part of the FIG. 23 system as shown encircled by the arrows 26—26. The FIG. 26 reactor can also be used in place of FIG. 25 structure in the FIG. 18 and FIG. 21 embodiments. The reactor shown in FIG. 26 incorporates a flash boiler as an integral part of the reactor and readily produces precombustion reaction products because the flash boiler is exposed directly to exhaust gas temperatures in the range of 1,000 to 1,800 degrees Farenheight. The reactor shown in FIG. 26 is a preferred, integrated form of flash boiler and water and fuel feed control.

FIG. 27 is a cross sectional view taken along the line and in the direction indicated by the arrows 27—27 in FIG. 26 and shows flow slots for permitting the metered feed water or combination of feed water and fuel to flow from the metering valve to the flash boiler. Also the exhaust total pressure port is shown.

FIG. 28 is a side elevation view, in cross section, of an injector assembly constructed in accordance with another embodiment of the present invention for injecting fluid at the idle screw opening of the carburetor.

FIG. 29 is a side elevation view of another embodiment of an emission control system constructed in accordance with the present invention. In the embodiment shown in FIG. 29, water is injected into the carburetor at a point (such as the idle adjustment screw) where the vacuum increases with increasing throttle opening and in a metered amount which is controlled by both changes in engine operating temperature and changes in vacuum conditions. In the FIG. 29 embodiment a flash boiler is not utilized and water (or water with additives) is injected into the engine intake without being converted to steam prior to injection, although in the FIG. 122 embodiment a certain amount of heat is added to the water.

DESCRIPTION OF THE INVENTION

Figure 1:
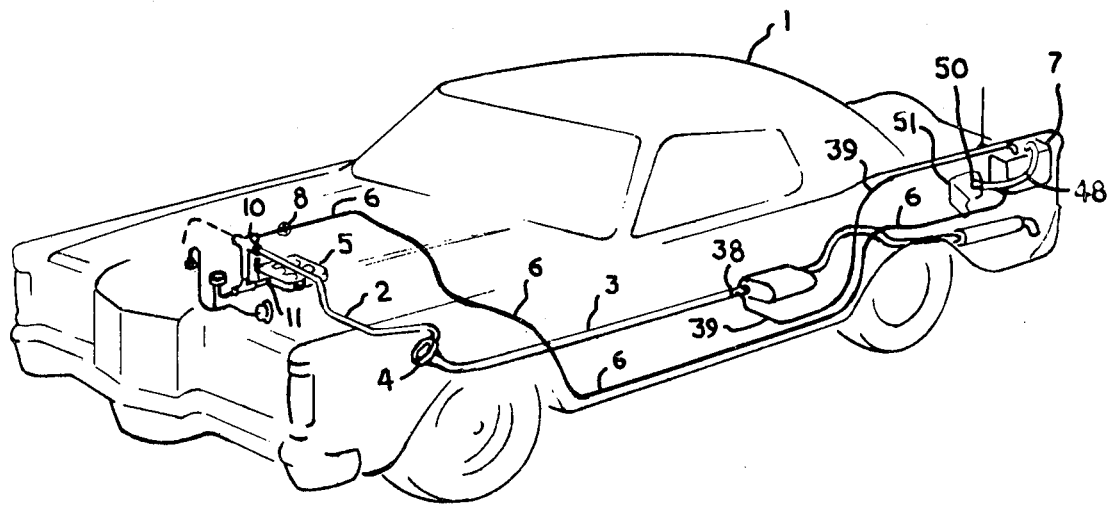
FIG. 1 is a phantom isometric view of a 1969 Continental Mark III car with one embodiment of the disclosed combustion improvement and emission control system installed.
Figure 2:
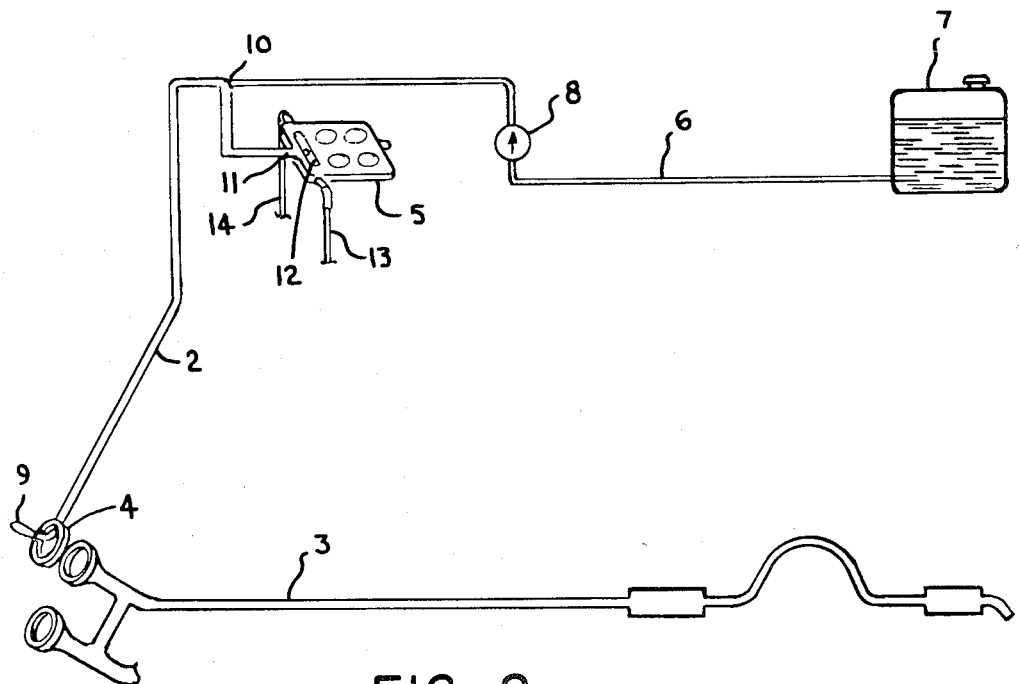
FIG. 2 is a diagrammatic view partly in isometric of one simple form of the disclosed combustion and emission control system.

Referring now to FIG. 1, the disclosed invention is shown installed in an automobile 1. Exhaust transfer line 2 is connected to the auto exhaust system 3 by means of a special adapter gasket 4. The opposite end joins carburetor adapter plate 5. Fluid carrying line 6 transfers fluid from tank 7 through check valve 8 to the flash boiler 9 joining it at 10 to its entrance into the exhaust transfer line 2. The exhaust transfer line is normally one-half inch to five-eighths inch diameter flexible corrugated stainless steel tubing. Flash boiler 9 may be stainless steel tubing 0.093 inches outside diameter. The flash boiler starts at 10 and passes down the exhaust transfer line to 4. Flash boiler is then formed to go forward into the exhaust manifold and returns into adapter gasket 4 and into the exhaust transfer line and terminates at the far end of the exhaust transfer line at 11 before entering adapter plate 5. Refer to FIG. 2 involving the basic system of the disclosed invention in its simplest form as shown in FIG. 2. Engine vacuum below the adapter plate 5 in the system shown in FIG. 2 typically will be, at idle, in the order of nineteen to twenty-one inches of mercury vacuum. This vacuum provides the force to draw the water from tank 7 through line 6, check valve 8, and into the flash boiler starting at 10 and carries the water down the flash boiler tube inside the exhaust transfer line steadily rising temperature gradient until it reaches 4 and goes into the very hot exhaust gases of the exhaust manifold, superheating the steam and then carrying it back through the flash boiler return line still surrounded by hot exhaust gases, to keep the steam at a very elevated temperature as it is carried clear back to 11 where flash boiler 9 ends before the entrance to plate 5. Exhaust transfer tube ends at 11 and the steam with the turbulent hot exhaust gases flows into the induction system at plate 5. There is a gradient of increasing temperature between 11 in exhaust transfer line 2 because of the heat transfer to the surroundings through the walls of the exhaust transfer tube 2. Provision of a rising temperature gradient in the flash boiler from the point of its entrance at 10 on down to 4 is important as it provides a great degree of stability in the flash boiler. The water entering the flash boiler at 10 is converted to steam after it has gone only a short distance down the flash boiler 2. As the engine's power is dropped, vacuum therefore increases as the throttle is closed. The increased vacuum and decreased temperature draw the water much farther down the flash boiler before it converts to steam. For good operation it is designed so that the water point never will go past the very high temperature of the flash boiler as it is extended out into the hot exhaust gases of the manifold. Thus, only steam will be fed into the engine from the flash boiler. It assures that steam will be formed in the flash boiler as it enters the hot exhaust gases and this steam so formed will stay as steam because it is surrounded by hot exhaust gases of the exhaust transfer line all the way from 4 back to 11 and on into the plate 5. Approximately one gallon of water is consumed for every five gallons of fuel. Therefore, in a large car approximately five gallons of water is desirable. Normally the water tank should be placed at the nearest convenient point to the engine, but in a modern car we find little space available near the engine and it is sometimes necessary then to locate the water tank in a wheel underwell or in the trunk as shown in FIG. 1. The low silhouette of the modern car also makes it more difficult to avoid the potential liquid lock that can occur in the car when it is tipped (as on a hill) so that the tank level of the fluid is higher than the flash boiler exit adjacent to plate 5. In this situation water will carry through the flash boiler system and into plate 5 and end up in the engine cylinders, causing what is called liquid lock. The water enters any open intake valve and enters the cylinder combustion chamber so that when the engine is started the next time, it comes up solid as it is full or partly full of liquid. It is a dangerous situation, because it can cause serious engine damage; if just the critical amount of liquid occurs to lock a cylinder at near top dead center and the engine is turning fast or starts to fire it can bend a link rod. FIG. 2 shows a drain groove 12 and drain lines 13 and 14 of one-eights inch copper tubing, for draining water away from the engine. In idling the flash boiler partially fills as the exhaust transfer line is cool and because the vacuum is high at idle in the system shown. As we accelerate the temperatures rise and the temperature of the exhaust transfer line increases, causing conversion of the held water in that line to steam, providing in part the extra steam needed for anti-detonant, anti-preignition agent during acceleration. The check valve is important as it prevents reverse flow in the water line 6 under conditions as just reviewed where steam is built up in the flash boiler. Absence of check valve 8 would cause an emptying of the flash boiler of residual water and during acceleration the above extra steam source would be unavailable.

The standard system, shown in FIG. 1 in a '69 model Mark III, has been on test for approximately six years using 91 octane no lead fuel.

An exhaust scoop 38 picks up total pressure and transfers it through pressure transfer line 39, which is a one-quarter to five-sixteenths inch copper tube, to water tank 7, to pressure this tank and thereby provide higher water feed pressure to the flash boilers. We need to have the flash boiler runs partially full so that as we accelerate we can get extra amount of steam at acceleration by the sudden increase in temperature of the flash boiler occurring due to sudden power increase, and we also need to have a continuous feed of steam throughout the cruising and high power operation. This is the function which the pressurized system on the tank 7 provides. As soon as the engine is started, the pressure starts to build up in the tank to approximately one pound, and as the power further increases to cruising operation, the pressures build up to five pounds. Pressure at high powers, and in any case of acceleration, goes right up to seven pounds. Steam pressures that are accompanying this match the power, or, during acceleration, exceed it, because of the sudden increase in temperature of the flash boiler causing extra steam to be made, converted out of the residual partially cool flash boiler suddenly converting a higher percentage of this water into steam during the period of acceleration due to the sudden increase in temperature of the exhaust gases at the flash boiler in the exhaust mainfold at 4 and in the exhaust transfer line. Water pressure to the flash boiler feed makes a very important change in characteristics of the system, greatly smoothes out the operation at higher powers, and eliminates detonation during acceleration in most all instances, when using 91 octane fuel in an engine designed for 100 to 101 octane fuel. Check valve 8 prevents the water partially filling flash boiler tube 9 and that in the region normally between 10 and 4 from being forced back into tank 7. Within a fill tube 48 is provided a small vent tube, running from one end to the other. At the end of fill tube 48 is a spring loaded cap 50 so that during filling the spring loaded cap will open and the nozzle is inserted into fill tube 48, but upon completion and removal of water fill nozzle, cap 50 automatically closes to assure the system is always closed during operation, so that pressure can be maintained in the entire system. (See FIG. 1) Fill cap 50 is located inside through back wall of the fuel tank fill compartment 51. This is done in order to assure that the service man will always refill the water tank each time he fills the fuel tank. The tank caps and connecting tubes are such that an error in tanks could not be made, filling a tank with the wrong fluid.

It is desirable to obtain the best possible mixing of the injected steam with the fuel air mixtures flowing to the engine cylinders.

In accordance with the present invention, resonance at ultrasonic frequencies is produced in the injected steam. The resonance produced causes pulses or shock waves in the fluid flowing into the engine. The shock waves increase the energy transferred to the engine itself. Pulsing at ultrasonic frequencies produces better mixing because it breaks down the barrier between the fuel and the air and the steam.

As illustrated in FIG. 3 a small orifice 422 is installed in the ported vent 410. The high velocity of the steam flowing through this small orifice 422 generates a shock wave to cause the desired ultrasonic result.

FIGS. 4-10 show additional embodiments for producing the desired resonance.

As illustrated in the lower part of FIG. 4, the resonance may also be produced by a mechanical driver or an electro-mechanical driver 424.

FIG. 5 illustrates an embodiment in which a whistle 426 is incorporated in the steam inlet conduit 314 for producing resonance. The whistle 426 includes an adjustable stop 428 for setting the frequency of the ultrasonic sound wave. This is shown in more detail in FIG. 8, which also shows insulation 315 around the conduit 314.

Figure 6:
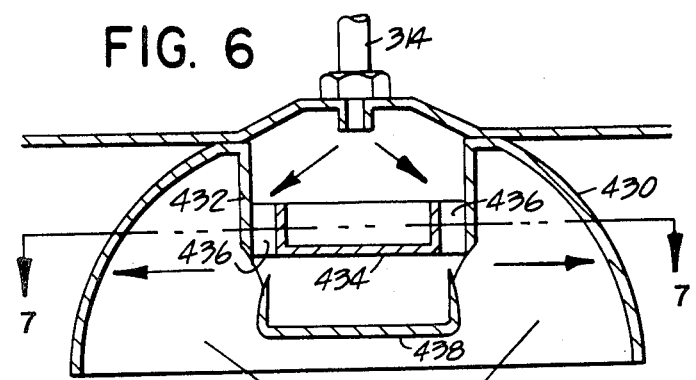
FIG. 6 is an enlarged fragmentary view in cross-section of the part of an air filter for an internal combustion engine which has a whistle arrangement for producing resonant shock waves in steam injected into the engine through the air filter housing in accordance with the embodiment of the invention shown at the top of FIG. 4.
Figure 7:
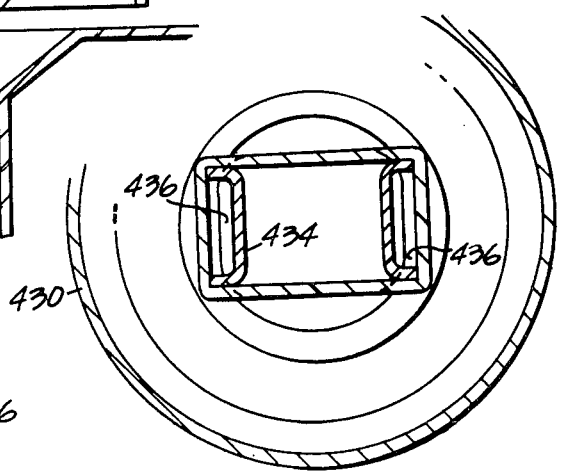
FIG. 7 is a top plan view, in cross section taken along the line and in the direction indicated by the arrows 7—7 in FIG. 6.
Figure 8:
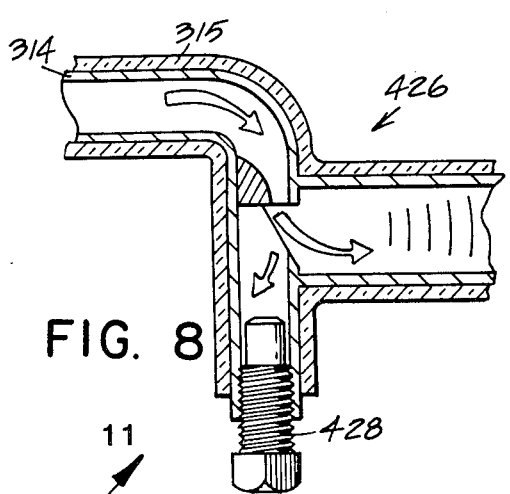
FIG. 8 is an enlarged view in cross section of the whistle arrangement shown in FIG. 5.

Alternatively, the inlet conduit 314 may be connected to the top of the housing for the air filter to produce a dual port resonance arrangement as illustrated in the top of FIG. 4 and as illustrated in greater detail in FIGS. 6 and 7.

In this embodiment the air filter housing is formed with a dome shaped member 430. A generally cylindrical member 432 is located within the dome shaped member 430 and a central baffle 434 provides two or more ports 436 which, in combination with a lower baffle 438 cause the steam flow to form shock waves. The resonance chamber formed within the interior of the dome 430 then reinforces and focuses the shock waves downward and into the inlet carburetor as illustrated.

In the FIGS. 4 and 6 embodiment the two whistles oscillate, that is, one whistle produces a shock wave front at one instant of time, and then the other whistle produces the subsequent shock wave front in the next instant of time before the subsequent shock wave front by the first whistle. It is like a push-pull amplifier. The passageways 436 and the wall 438 act together to provide the resonance and the disturbance resonant chamber for producing alternation of the whistles.

Figure 12:
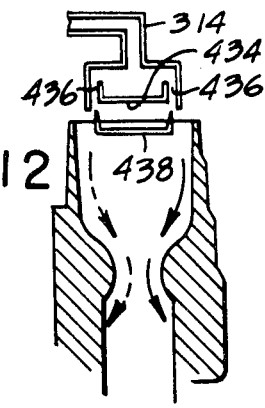
FIG. 12 is a diagrammatic view illustrating how the ultrasonic steam injection arrangement shown in detail in FIG. 6 operates as a resonant fluidic amplifier to produce a better distribution of the steam in the passageway below the carburetor. The arrangement shown in FIG. 12 involves a resonant whistle couple which causes the air to flow first in one downwardly curved direction as shown by the solid arrows and then in the other downwardly curved direction as shown by the dashed arrows.

FIG. 12 illustrates how an ultrasonic arrangement like that shown in FIG. 6 is made to function as a resonant fluidic amplifier for causing the mixture flow to sweep across the carburetor venturi in resonance with the alternation of the shock waves to provide better mixing and distribution.

When two whistles are diagonally offset from each other, the mixture flow follows first the path indicated by the full line arrows in FIG. 12 and then the path indicated by the dashed line arrows in FIG. 12 as the shock waves emanate from first one passage 436 and then the other passage 436 in the diagonal couple. A plurality of couples can be used to produce deflection in directions other than those indicated by the full line arrows and the dash line arrows in FIG. 12.

Figure 13:
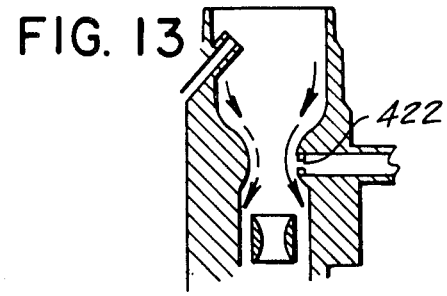
FIG. 13 is a diagrammatic view showing a boundary layer type of resonant fluidic amplifier associated with the venturi just downstream of the throat of the carburetor. The arrangement shown in FIG. 13 uses high frequency high pulses to deflect the stream at the same frequency as the pulses so that the stream will sweep back and forth across the passageway.

FIG. 13 illustrates another embodiment of a resonant fluidic amplifier constructed in accordance with the present invention.

In FIG. 13 an orifice 422 like that shown in FIG. 3 is incorporated in the sidewall of the carburetor slightly below the throat. The high frequency pulses produced by the orifice act on the boundary layer to deflect the stream at the same frequency as the pulses so that the stream sweeps alternately back and forth across the passageway as illustrated by the full line arrows and the dashed line arrows.

A steam whistle like the whistle 426 shown in FIG. 5 or a driver arrangement like 424 shown in FIG. 4 can also be used with the resonant fluidic amplifier arrangement shown in FIG. 13. Ultrasonic devices used with the embodiment shown in FIG. 13 can be located at one or more locations around the venturi to produce any desired geometry of stream deflection.

Figure 11:
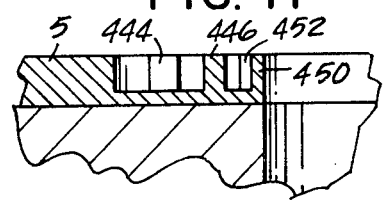
FIG. 11 is a fragmentary side elevation view in cross section taken along the line and in the direction indicated by the arrows 11—11 in FIG. 10.
Figure 10:
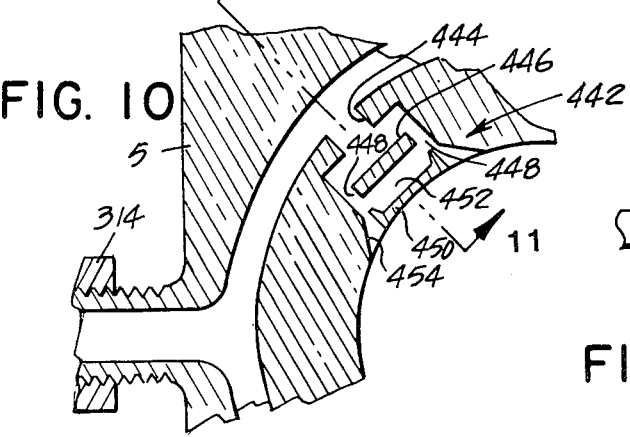
FIG. 10 is an enlarged fragmentary view showing a portion of one of the whistles incorporated in the FIG. 9 embodiment.
Figure 9:
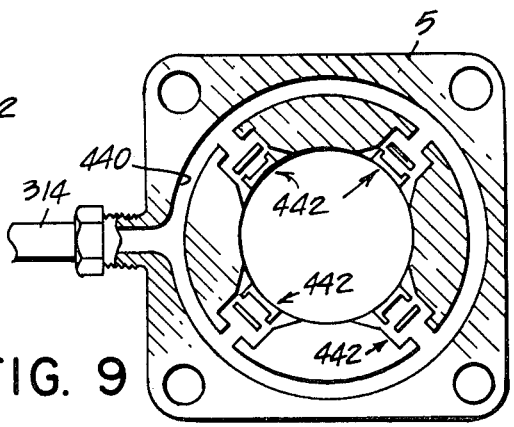
FIG. 9 is a top plan view, in cross section, through a carburetor adaptor plate showing how a series of whistles are formed in the steam inlet conduit for producing resonant shock waves in the steam injected and for focusing the shock waves so produced to increase the effectiveness of the intermixing produced by the shock waves.

FIGS. 9-11 illustrate another embodiment of the present invention for producing resonance. In this embodiment the resonance is produced and focused by the adaptor plate 5. As best illustrated in FIG. 9, the adaptor plate 5 has an outer annular channel 440 connected to the steam inlet 314. A plurality of whistles 442 are connected to the channel 440 and produce shock waves in the steam flowing from the channel 440 into the inlet to the carburetor while focusing these shock waves to reinforce the energy distribution effect of the shock waves. Thus, as illustrated in detail in FIG. 11 each whistle 442 comprises a passageway 444 opening to the annular passageway 440. A baffle 446 causes the steam to divide into two paths and to flow through orifices 448. A second baffle 450 provides a resonance chamber 452 and causes the steam to exit from ports 454 in high energy intensity and focused shock waves. Because the shock waves are focused, the forces increase as the square of the mass velocity of the fluid flowing through the orifices. This produces a greatly increased transfer result.

Figure 14:
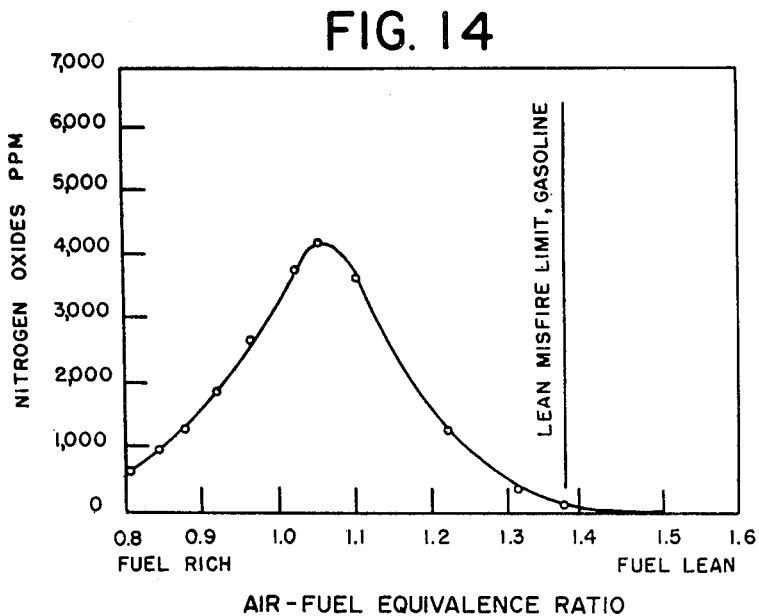
FIG. 14 is a graph of air fuel equivalence ratio versus nitrous oxides and shows how the nitrous oxides are drastically reduced at higher air-fuel ratios near the lean misfire limit line for gasoline.

FIG. 14 is a graph which shows the relationship of nitrogen oxides to air-fuel equivalence ratio. FIG. 14 also shows the lean misfire limit line for gasoline. This line lies about three-quarters of the way between the 1.3 and the 1.4 air fuel equivalence ratios. FIG. 14 illustrate that nitrogen oxides emissions are drastically reduced by operating near the lean misfire limit. Operating in this area also produces lower peak temperatures and some air cooling.

By adding hydrogen gas to the air-fuel mixture it is possible to operate on the right-hand side of the lean misfire limit line for gasoline shown in FIG. 14. The hydrogen gas has a very wide range of combustibility, and by adding hydrogen to the mixture it is possible to broaden the combustibility range, and this permits operating on the right-hand side of the lean misfire limit line as shown in FIG. 14. Adding hydrogen permits going lean and still getting consistent, steady combustion. Running on the lean side provides plenty of air to always create total combustion of the fuel so that you have a minimum of carbon monoxide and a minimum of unburned hydrocarbons. Also the temperature is brought down, in some cases as low as 1500° F. or 1300° F. In this range essentially all nitrous oxide formation is eliminated.

Even at higher combustion temperatures, the addition of steam, of course, helps to lower the combustion temperature.

However, running lean produces benefits separate and additional to the injection of steam. Running lean substantially cools the combustion cycle and in effect adds an air cycle. Thus, the addition of hydrogen to permit running lean provides benefits separate and additional to those benefits produced by the injection of steam as described above.

Another advantage of hydrogen is that it produces extremely high mobility because of its low mass, and therefore it ends up transferring energy readily between the steam, the hydrogen, the fuel and the air to create good heat transfer. This also provides good vaporization of the fuel and good distribution of all of these named constituents so that they will distribute equally between all of the cylinders. This uniform and even distribution is produced because hydrogen is an even better heat transfer agent than the steam itself.

It is an important feature of the present invention that the steam injection can be utilized to increase hydrogen gas inducted into the engine.

Hydrogen can be formed by a number of ways in association with the injected steam.

First, hydrogen can be formed by passing steam in excess over iron and then taking the resulting oxide and reducing it by hydrocarbons, such as water gas.

Secondly, the steam can be made to react directly on hydrocarbons to form hydrogen.

Third, hydrocarbons can be thermally decomposed to form hydrogen.

In all cases the yield of hydrogen from the use of the steam on the hydrocarbons can be greatly improved by the use of catalysts.

The reaction can also be made more complete and can be made to react easier by the use of ultrasonic energy.

Figure 15:
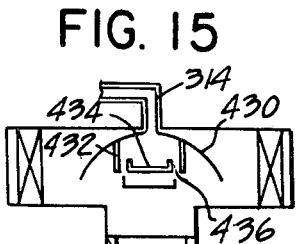
FIG. 15 is a diagrammatic side elevation view, partly in cross section, showing how a catalyst is associated with the ultrasonic steam injection arrangement shown in FIG. 6 for increasing the hydrogen gas in the fluid mixture inducted into the engine.

FIG. 15 shows an embodiment of the invention in which a catalyst is used with steam injected with ultrasonic energy.

As illustrated in FIG. 15 steam is injected in resonant shock waves through the opposed ports 434 as in the arrangements illustrated and described with references to FIGS. 6 and 12. The steam then passes over a catalyst 500 downstream of the venturi of the carburetor. As illustrated in FIG. 15 the fuel is injected at the throat. The air-fuel, steam mixture then passes over the catalyst 500.

The catalyst 500 may be a platinum catalyst. It may be preheated to an optimum reaction temperature. Platinum works better as a catalyst after it is warmed, and the injected steam helps to heat the platinum catalyst very rapidly. Electric heating may be added as illustrated in FIG. 16.

The catalyst 500 decomposes a part of the hydrocarbons in the mixture flowing across the catalyst to produce a substantial amount of hydrogen gas.

Figures 16, 17:
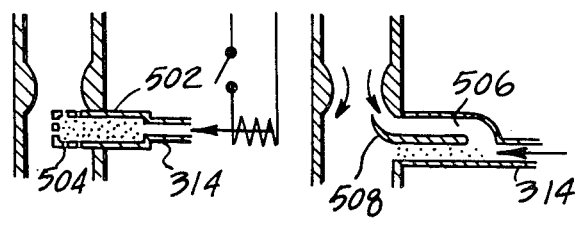
FIG. 16 is a side elevation view showing how a catalyst is mounted in a preforated structure which prrojects a short distance into the fuel-air mixture stream to provide an interaction area in which the catalyst reforms hydrocarbons into hydrogen gas, carbon dioxide and water in the form of steam.
FIG. 17 is a side elevation view like FIG. 16 but showing an alternate embodiment in which the catalyst is mounted in a channel which receives steam at one end and which receives the fuel-air mixture by means of a total pressure scoop at the other end. The fuel-air mixture and the steam react with the catalyst to increase the hydrogen content of the mixture inducted into the engine.

FIG. 16 shows another embodiment of a catalyst constructed in accordance with the present invention. Electric heating may be added to further superheat the steam.

In FIG. 16 a cylindrical container 502 projects into the passageway downstream of the carburetor venturi. The cylinder 502 is perforated with openings 504 to permit the fuel-air mixture to flow readily into the interior of the cylinder. Superheated steam is conducted into the cylinder 502 by the steam conduit 314.

The cylinder 502 contains a catalyst for reforming the hydrocarbons into hydrogen and other components. The catalyst used in the FIG. 16 embodiment is powdered aluminum oxide and silico-carbide. The perforated cylinder 502 supports the catalyst and permits the fuel-air mixture to flow through the catalyst for the interaction to reform some of the hydrocarbons to hydrogen and other components.

FIG. 17 shows another embodiment of the present invention in which a channel 506 is located at one side of the passageway downstream of the carburetor throat. The channel 506 is supplied with a part of the fuel-air mixture going through the passageway by a total pressure scoop 508. Steam is also fed into the channel 506 by the steam conduit 314. A powdered catalyst is located in the channel 506, beneath the scoop 508 as illustrated, and the mixture of fuel, air and steam flows through the catalyst. Electric heating to heat the catalyst and/or further superheat the steam may be added as shown.

A suitable catalyst is powdered aluminum oxide and silico-carbide.

The channel 506 provides a means for localizing and for giving time for the reaction of the steam and the hydrocarbons. In all chemical reactions there is a certain amount of time needed to produce a desired amount of reaction, and the channel 506 provides for an adequate amount of reaction time before the components are fed back into the passageway, as illustrated by the arrow in FIG. 17.

In place of the fuel air mixture a part of the carbureted fuel can be fed from the carburetor fuel output direct to the catalyst-steam reactor This reduces the heat energy required for the reaction.

The following general equation describes the reaction in which hydrogen gas is formed by the steam reforming process on hydrocarbons:

$$C_n H_m + H_2O \longrightarrow n\, CO + \frac{2n + m}{2} H_2$$

Under proper control conditions combustion is aided by the steam reforming process. Hydrocarbons furnish the source of hydrogen and the basic reaction is favored by higher temperatures and lower pressures. This is the combination that we have in the induction system. With the steam addition we have the temperatures and the lower pressures, and this is ideal.

The following formula describes the water gas, steam, shift reaction:

$$CO + H_2O \rightarrow CO_2 + H_2$$

This reaction is not affected by pressure, but it is favored by lower temperatures. Lower temperatures, however, reduce the reaction rate. So it is a matter of leveling and balancing.

A nickel base catalyst, a platinum catalyst or an aluminum oxide plus silico-carbide catalyst can be used for enhancing the amount of hydrogen produced by these general reactions.

This reforming process is also further aided by ultrasonic energy which (as described above) can be produced as an inherent part of the steam injection.

It is also possible to disassociate water by itself into free hydrogen gas and oxygen gas, without the presence of fuel or carbon monoxide, when the water is subjected to a high enough temperature.

In accordance with the present invention it is possible to get access to the high temperatures available in the combustion chamber by means of a coaxial flash boiler (that projects into the combustion chamber on at least a surface of the flash boiler) or by a heat pipe which conducts heat from the combustion chamber to the flash boiler with very little loss of heat in the heat pipe.

In addition, electric heating may be added to the heat from the combustion chamber to further super-heat the water to cause it to disassociate into free hydrogen and oxygen.

Free hydrogen can therefore be produced in any number of ways. The free hydrogen can be produced by combining hydrocarbons with water or steam in a reaction to produce free hydrogen as one of the end products. The water alone can be disassociated by sufficient heat or by heat plus catalysts to form free hydrogen as one of the end products. The hydrocarbon fuel can be reformed by adding water or steam or some other material or in the presence of other materials (with the right amount of heat) to form free hydrogen gas as one of the end products.

As indicated above, the steam injection system of the present invention has utility in engines other than the reciprocating piston engine.

Another embodiment of an emission control system constructed in accordance with the present invention is illustrated in FIG. 18 and is indicated generally by the reference numeral 501.

The system 501 includes a water tank 503, a flash boiler 505 and a variable orifice control valve 507 for regulating the amount of feed water which can flow from the tank 503 to the flash boiler 505.

It is an important feature of the system 501 shown in FIG. 18 that the steam generated in the flash boiler 505 is fed into the induction system of the engine at the idle adjustment screw 509.

Feeding the steam into the engine at this point has a number of advantages. The idle adjustment screw location is a location of high turbulence in the carburetor, and this facilitates mixing of the steam with the air/fuel mixture.

Also, this location provides a very desirable relationship between the vacuum at this location and the throttle position.

This relationship is illustrated in FIG. 22 where the vacuum at the idle screw location is plotted for various throttle openings (as indicated by the dashed line). The vacuum at the idle screw location varies from about 10 inches of water at closed throttle to slightly over 100 inches of water at near full throttle in a generally linear relationship to increasing throttle opening. For the purposes of the present invention the amount and the variation of the vacuum at the idle screw provides a better coaction with the generated steam for supplying the engine need at the various throttle openings than does the vacuum at other locations, such as the vacuum within the manifold and beyond the carburetor (shown by the solid line in FIG. 22) or the vacuum at the ported vent (shown by the chain-dashed line in FIG. 22). The vacuum within the manifold and beyond the carburetor has a variation which is essentially just the opposite of what is desired for inducting the steam in the amounts required at different conditions of engine operation.

The variation in vacuum at the ported vent with changes in throttle opening is actually such that the vacuum at the ported vent does provide a desirable coaction with the steam injection system of the present invention. However, one major drawback of using the ported vent is the fact that in a substantial part of both new and used cars a ported vent is provided only for one barrel of a multibarrel carburetor as part of the original equipment of the car. Thus, to use the ported vent for both barrels requires reworking of the carburetor. An additional drawback of using the ported vent is the fact that in many engine constructions the ported vent is connected with the vacuum spark advance so that connecting the steam injection apparatus to the ported vent requires some compensation to accomodate the effective loss of vacuum for the vacuum spark advance which is produced by connecting the steam injection conduit to the ported vent.

In constrast, introducing the steam through the idle adjustment screw has the advantage of using a connection which is almost always present in the engine carburetor, whether single barrel or multi-barrel; and the use of the idle adjustment screw does not require any other compensation because the idle adjustment screw is not connected with any associated engine apparatus, such as the vacuum spark advance.

A conduit 511 conducts feed water from the tank 503 to the metering valve 507 (shown in more detail in FIG. 25). A conduit 513 conducts the metered water from the outlet of the metering valve 507 to (as illustrated in FIGS. 18, 19, and 20) a T-joint connection 515. A conduit 517 connected to the T-joint connection 515 conducts the metered water to the inlet end of the flash boiler 505 which may be at the top as in FIGS. 18 and 19 or at the base (adjacent to the manifold) as in FIG. 21.

As best illustrated in FIG. 25, the flash boiler 505 is a coiled tube construction which encircles an outer body 519 of the metering valve 507.

In the embodiment shown in FIG. 21 the flash boiler 505 is disposed entirely on the outside of the engine exhaust gas manifold 521 and is held in a clamped position on the outside of the exhaust manifold by a flange 523 which forms a part of the metering valve assembly 507 and which engages the upper, outer end of the flash boiler 505. See also FIG. 25.

The outlet end of the flash boiler 505 is connected to the idle adjustment screw fitting 509 by a conduit 525 and a branch conduit 525A. See FIG. 18.

While obtaining the response to vacuum at the idle adjustment screw has been shown and described by connecting a conduit 525A directly to the idle adjustment screw, other apparatus for obtaining the vacuum at this point can also be used. For example, a tube can be extended downwardly within the carburetor from the top of the carburetor to the throat of the venturi at the idle adjustment screw to pick up the vacuum at this point. In new car construction, it is relatively easy to select any one of a number of desired locations on the carburetor which will provide the desired vacuum change in response to throttle openings, and it is not necessary to use the vacuum exactly at the idle adjustment screw. However, the idle adjustment screw does provide a convenient point which is available in almost all cars, both new and old, that provides the desired type of change of engine vacuum with change in throttle opening.

As illustrated in FIG. 21, the conduit 527 is connected to the ported vent entrance 529 of the engine carburetor and to the vacuum spark advance unit 531.

The vacuum at the ported vent 529 is, in most conditions of engine operation, greater than the vacuum at the idle adjustment screw 509. This relationship is graphically illustrated in FIG. 22 as described in more detail above.

Because the vacuums at the ported vent 529 and at the idle adjustment screw 509, and the vacuums within the related conduits 525A and 527, are different, it is necessary to provide a balancing apparatus and technique so that these two conduits 525A and 527 can be connected together as illustrated.

As illustrated in FIG. 21, this balancing apparatus comprises a restricting orifice 533 in the conduit 527 and an air bleed hole 535 which is open to atmosphere and which is also located in the conduit 527. The combination of this air bleed to atmosphere and the restricting orifice serves to lower the vacuum in the line 527 and so that it will essentially match the vacuum line 525A. This balancing apparatus and action insures that steam will flow to both the ported vent 529 and the idle adjustment screw 509 and prevents higher vacuums at the ported vent 529 from overpowering the vacuum in the line 525A and causing any reverse flow. FIGS. 18 and 21 also show a conduit 669 to a PCV valve 670 and, further, a lean-out valve 709.

The location of the flash boiler 505 on the outside of the hot exhaust manifold 521 causes the flash boiler to pick up enough heat to convert the water in the line 517 to steam at the outlet 525 of the flash boiler.

As best illustrated in FIG. 25, the heat transfer is primarily from the hollow interior of the relatively thin wall of the body 519 and to the coils of the flash boiler 505, rather than from the exhaust manifold wall structure to the coiled tubing of the flash boiler.

Thus, as best illustrated in FIG. 25, the body 519 of the metering valve assembly has an open lower end 537 which is threaded into a tapped opening 538 in the exhaust manifold 521, and the hot exhaust gases within the exhaust manifold flow upward and into the hollow interior 539. The body 519 is preferably made of a material having a high heat conductivity such as brass, and the flash boiler 505, in a specific embodiment of the present invention, is made of commercially pure aluminum for corrosion resistance and high thermal conductivity and low cost. In this specific embodiment the OD of the flash boiler tubing is approximately $\frac{1}{8}$ inch.

As in the prior embodiments of the present invention, the valve assembly 507 controls the amount of feed water which can flow to the flash boiler 505 to produce an amount of generated steam in response to changing engine need (discussed in more detail below) during changing conditions of operation of the engine. For example, the metering valve assembly 507 will open wider to admit more water into the flash boiler for producing greater amounts of steam at conditions of engine operation in which the engine power and exhaust gas temperatures are high, and the metering valve 507 will reduce the amount of feed water that can flow to the flash boiler 505 during conditions of engine operation in which little injected steam is needed, such as operation at low power and low throttle settings such as just above idle.

The way in which the metering valve 507 does this will now be described in detail with reference to FIG. 25.

The metering valve 507 comprises the lower body or plug 519 as noted above.

The valve assembly 507 also comprises a valve seat 541 and movable valve element 543.

The valve element 543, in the embodiment illustrated in FIG. 25, comprises a spherical upper end formed on a wire 545, which may be about 0.060 inch OD in a specific embodiment of the present invention and which may preferably be formed of a low expansion material such as molybdenum. The greater part of the length of the wire 545 is disposed concentrically within a thin wall tube 547 which may be made of a material having a relatively high coefficient of thermal expansion, such as stainless steel. In a specific embodiment of the present invention, this stainless steel tube 547 is 0.093 inches OD. The tubing 547 is thin wall tubing providing adequate clearance between the inside diameter of the tubing 547 and the wire 545.

The upper flared end 549 of the tube 547 is held in an upper head assembly (indicated generally by the reference numeral 551 in FIG. 25). The upper head assembly 551 comprises a first member 553 which has a conically tapered seat for supporting the underside of the flare 549, and the assembly 551 includes an inner member 555 which has a cone-shaped lower end for engaging the opposite face of the flared end 549. The part 555 is threaded, by threads 557 in to the part 553, and the part 553 is retained in position within and on the shell housing 519 by a nut 559 which is threaded onto the upper end of the shell housing 519 by threads 561.

While the upper end of the rod or wire 545 is free to move with respect to the tube 547 on differential thermal expansion between these two parts, the lower end of the rod 545 is locked to the tube 547. As illustrated in the lower part of FIG. 25, the bottom end 563 is welded closed, and the tube and inside wire are bent as indicated at 565 to prevent any relative movement between these two parts at this lower end of the tube and wire. Thus, on differential thermal expansion between the tube 547 and the wire 545, the upper end 543 of the wire will move with respect to the valve seat 541 in an amount dependent on the temperature level of the exhaust gases within the engine exhaust gas manifold 521.

As the exhaust gas temperature in the exhaust manifold increases, the tube 547 will expand in a greater amount and at a greater rate than the wire or rod 545 and this will retract the upper end 543 of the wire off of the valve seat 541 to permit a greater amount of feed water to flow from the inlet 511 to the outlet conduit 513.

Normally, the metering valve assembly 507 is calibrated so that the valve is just closed off at normal engine idle speed. This calibration is normally done at the point of manufacture by adjustment of the valve seat 541. The valve seat 541 is formed on the underside of a member 567. The member 567 is movable within the fitting 511 for achieving this calibration. In one form of the invention the member 567 is threaded within the fitting 511. In another form the member 567 is held by a pressed fit within the fitting 511. In either case the calibration of the valve is set by applying vacuum to the fitting 513.

The member 567 is calibrated by moving it to a position to properly preload the seat 541 and the valve element 543 such that at the desired engine operating temperature these two members just open.

The location of the tank 503 is an important feature of the present invention. By having the tank in the engine compartment and above the engine, the water in the tank absorbs heat and tends to provide temperature stability to the engine compartment in the area around the carburetor and its induction manifold. Because the water has a high latent heat, the heat absorbed in the stored water is retained in the engine compartment over a considerable period of time, and this is helpful in subsequent start-ups after the engine has been shut off for a period of time because it helps provide improved vaporization of the fuel and more uniform distribution of temperature throughout the engine induction structure. This also provides more uniform mass distribution between each of the cylinders and also more uniform fuel/air ratio between each of the cylinders.

The storage tank 503 is also preferably made of flexible plastic material so that the water tank is soft and pliable and can conform to the space available within the engine compartment. This enables the tank to provide the required water capacity even in engine compartments which are quite crowded and which have such an irregular space arrangement that a rigid water tank could not be used.

The flexibility of the tank also facilitates initial installation.

The location of the tank above the flash boiler and the control valve assembly is also an important feature of the present invention because it provides a vertical head of water for insuring proper feed to the control valve assembly 507. This insures that the flash boiler will always receive flow regardless of the amount or lack of engine vacuum at any engine operating condition.

It is another important feature of the present invention that the system 501 incorporates both a fluidic drain valve and a flexible wall accumulator which co-acts with the changing engine vacuum at the idle screw and ported vent to provide increased steam flow on acceleration and to provide decreased steam flow to the engine on deceleration over and above the regulation that is obtainable from the valve 507 itself and the dynamic response of this valve to changing engine temperatures during such an acceleration and deceleration period as required to match engine need during all conditions of operation.

On acceleration the callapsible accumulator decreases its volume by collapsing its walls in proportion to the amount of vacuum during acceleration. This provides the needed additional steam during the higher BMEP of acceleration which generates higher temperatures. The extra steam thereby prevents excessive temperatures preventing both preignition and detonation and the formation of unwanted nitrous oxide.

In the FIG. 19 embodiment the flexible wall accumulator is indicated by the reference numeral 569 and the fluidic drain valve is shown at 571.

In the FIG. 20 embodiment the flexible wall accumulator and fluidic drain valve are combined in one structure as illustrated. The FIG. 20 embodiment in a preferred form can be made with wall thickness nearly uniform such that the flexible wall accumulator fills by water coming from valve 507 connection without restriction. Upon acceleration the upper part of the accumulator collapses to partially restrict further flow of fluid from the accumulator 569 to the flash boiler 505. This provides modulated flow preventing excessive water flow which could cause unstable engine operation.

On deceleration it is also important that the accumulator 569 (FIG. 19) now expands by its built-in resilience to create a vacuum on the system going to the input points of the ported vent and/or idle screws so that the fluid in these lines, including steam and/or water particles, is pulled back during this deceleration mode in which we do not want to have appreciable further steam going into the engine in order to get minimum formation of emissions especially CO (carbonmonoxide) and HC (hydrocarbons). This provides optimum combustion conditions and optimum economy of operation. This water cannot be controlled instantly by the control valve. Not that the valve does not operate quickly enough in itself, but that the mass of the material of the manifold around the valve cannot cool that quickly. Therefore, to overcome this basic inherent problem of the engine itself, the accumulator is able to control this inherent overrun of too much fluid which would be allowed to come through the system without the use of this accumulator. Further, the accumulator by design is set so that for the normal deceleration mode the excess water is fully taken up within the expanding accumulator. However, if there is still some residual fluid coming through the valve on a very heavy deceleration following a very long and heavy power use of the engine which caused a great increase in heat stored in the engine, we have the overflow capability of the fluidic control valve so that it is able to take care of this overflow without letting the water come up as high as Tee 515, and the water therefore cannot go into line 517. Instead the water will follow down line 573 to the fluidic valve 571 and overflow out of the top of the fluidic valve to get rid of the excess fluid.

As illustrated in FIG. 19, the distance D between the Tee 515 and the upturned end 571 of the fluidic drain is equal to or slightly greater than the vacuum in inches of water at idle. This has the advantage that even if the valve should leak, no fluid would be drawn into the engine during idle because the static head of the fluid in line 573 would be equal to or greater than the available vacuum in the idle system and therefore could not draw water into the engine under the conditions in which it is not needed or wanted.

The valve 571 is placed in the manner shown such that it is vertically and therefore normally wet inside to provide optimum sealing since it is important not to allow any air bleed into the system at any point to get good optimum combustion control.

The system is shown with the tube which is normally ⅛ inch aluminum tubing placed within a coil 575 formed into an external, continuous support structure so that is provides a coil-like structure around the outside of the fluidic valve 571. This gives protection and support to the flat rubber (normally neoprene or similar material) valve which is, as shown, made with a structure that is essentially like a round tube which has been flattened out in the final stages of its formation and curing process.

The combined fluidic drain valve and flexible walled accumulator shown in FIG. 20 operates in essentially the same manner as described above with reference to the separate flexible wall accumulator and fluidic drain valve shown in FIG. 19.

The system of the present invention is designed to accept freezing conditions. When the engine is turned off, the control valve 507 closes. The flash boiler 505 and the water and steam feed system drain, leaving water only in the container 503, the flexible neoprene feed water tube 511, the collapsible reservoir 569 and the fluidic drain valve 571 with its coiled flexible support tube 575. These elements are designed with a form and of material to permit the required expansion of about 4% at the time of any possible freeze of the contained water and so no damage occurs on freezing. Upon starting the engine after the freeze, the local, adjacent heat melts the ice, and the system operates normally.

It is another important feature of the present invention that the dynamics of the system are matched to the engine characteristics such that within the vacuum change range the accumulator 569 will change its volume proportionate to the changes in vacuum of the engine and will therefore continuously provide the additional needed $H_2O$ into the form of steam to the engine as the power is on the increase and will retake back excess $H_2O$ preventing it from going in the engine on decrease of power so that it will even out dynamically the needs of the engine throughout all of the variable states of operation of power and throttle settings.

In certain conditions of operation it is desirable to be able to overrun the flash boiler so that all of the feed water passing through the flash boiler is not converted to superheated steam. Instead, under certain conditions of engine operation, such as rapid acceleration at full throttle, it is desirable that the steam fed to the engine actually include droplets of water because of the latent heat of vaporization incorporated in these droplets of water and the effect that these droplets of water therefore have on lowering engine combustion temperatures under these particular severe conditions of engine operation. That is, if a certain amount of droplets of water are fed with the steam into the engine at these severe conditions of engine operation, the droplets of water will provide a much greater effect in lowering engine temperatures than would an equivalent amount of steam, and the resulting increased lowering of the engine operating temperatures reduces the amount of undesired engine emissions which would otherwise be produced, mostly nitrous oxide.

Another benefit of being able to override the flash boiler is that the mass of fluid is physically greater if some of the fluid is in a liquid state rather than a gaseous state. And at these particular conditions of engine operation, it is important to provide a greater mass flow of fluid, water and steam to the engine, than would otherwise be obtainable by the dynamic operation of the metering valve assembly 507 alone. The increased fluid flow is obtained in the present invention by the combination of several features of the present invention.

In the present invention there are three effects operating.

There is a pumping effect due to the flexible wall accumulator and the inward flexing of these walls because of increasing vacuum on acceleration.

There is an increased opening of the metering valve itself because of the increasing temperatures occurring on acceleration and the resultant increase in the differential expansion between the operating elements of the metering valve.

And there is also the effect of putting more heat into the flash boiler contents already there to cause it to expand and therefore move into the input point of the engine adding, therefore, to the total mass flow into the engine.

FIG. 23 illustrates another embodiment of the present invention which meets fundamental engine needs for injected steam flow by an apparatus which can regulate the flow in response to an engine vacuum condition and which may incorporate a fixed orifice rather than a variable area orifice which is varied in response to changing engine temperature conditions.

This FIG. 23 embodiment may, however, incorporate a variable area orifice; and it may also incorporate (as illustrated) apparatus for mixing fuel with the injected steam.

In the embodiment in which a fixed, rather than a variable area orifice is used, it is an important feature of the present invention that a flexible wall accumulator is associated with the water supply control to the flash boiler, or other heater, so that the increased fluid flow on acceleration is provided as a function of changing engine vacuum and so that also decreasing fluid flow is provided on deceleration in relation to changing engine vacuum also applied to the fixed area orifice.

As illustrated in FIG. 23, the system includes a water storage tank 503 and a conduit 511 extending from the bottom of the storage tank 503 to a second water tank 603.

The purpose of the tank 603 is to establish a level of water in the tank 603 at a given distance, as indicated by the legend Hw, below the input to the flash boiler 505. This static head between the upper surface of the water in the tank 603 and the inlet to the flash boiler 505 is preferably made just greater than the static head as measured in inches of water of vacuum at the idle screw at idle RPM. See FIG. 22 where the vacuum at the idle screw at idle RPM is approximately 10 inches of water. It should be noted that this 10 inches of water is also equivalent to the same static head measured in a somewhat greater number of inches of fuel (as will be described in more detail below) since fuel has a lower specific weight than water.

A conduit 511A extends from the tank 603 to an orifice 605. As illustrated in FIG. 23, the orifice 605 may, in the simplest form of the present invention, be a fixed area orifice. It should be noted, however, that a variable area orifice may also be used with the system shown in FIG. 23, and this will become more apparent from the description which will follow.

A proportioning orifice 607 may be used in the conduit 511A when fuel is added to the injected steam, as also will be described in more detail below.

In the embodiment illustrated in FIG. 23, a fluidic drain valve 571 is combined with a flexible, resilient walled accumulator 569 at a location between the orifice 605 and the flash boiler 505.

A conduit 525 and a related branch conduit 525A conducts the generated steam from the flash boiler 505 to the engine induction system at the idle adjustment screw 509. In the operation of the structure thus far specifically described, the height Hw between the inlet of the flash boiler 505 and the level of the water in the tank 603 is so related to the engine vacuum developed at the idle adjustment screw 509 at idle RPM that static head effectively prevents flow of steam to the engine at engine vacuums corresponding to idle RPM or less.

As engine RPM increases, the vacuum at the idle screw 509 increases generally in the manner indicated by the dashed line in FIG. 22 so that increasing engine power produces greater vacuum at the idle screw 509.

The plot of the amount of vacuum at the idle screw versus increasing throttle opening as shown in FIG. 22 represents more or less steady state engine operating conditions at each power point. Therefore, it is possible to match the engine need for injected steam at a particular throttle opening by a proper size of the orifice 605. Having selected that orifice size, then, at other steady state throttle openings, the amount of water which will flow through the orifice 605 is dependent on the amount of vacuum; and this provides a proper amount of injected steam in response to engine need.

Under dynamic change the extra amount of steam of lower quality (some entrained water droplets with the steam) is provided to meet the engine need (due to higher BMEP and higher power) in the following manner. As shown in FIG. 22 as the throttle is opened, greater vacuum appears at the 509 idle screw. This increases flow through the fixed orifice 605. Also the increased power increases the temperature of the flash boiler 505 which expands the quantity of the fluid in the flash boiler and so increases the mass flow of the fluid into the engine. In addition, flexible resilient walled reservoir 569 reduces its volume by transferring this volume to the engine collapsing its walls in direct proportion to the vacuum increase at 509 transferred through 525A, 525 and 505 to appear inside reservoir 569. This transferred volume partially overloads the flash boiler 505 resulting in lower steam quality (some entrained superheated water droplets entrained within the steam flow) as desired to meet the engine need.

During dynamic change of deceleration the throttle is closed decreasing the vacuum across orifice 605 to Hw so that the static lead Hw stops further flow. Also the exhaust temperature and therefore the flash boiler 505 temperature decreases reducing the charge volume and therefore flow. Also, the reduced vacuum at 509 through 525A, 525 and 505 appears inside 569. This permits the resilient walls of the reservoir to expand and draw any now unwanted liquid or vapor from 509, 525A, 525 and 505 back into expanding reservoir 569 thus meeting the dynamic engine need.

Note that the vacuum sensing and the fluid feed is through the same line providing optimum performance and simplicity.

Thus, at non-steady state engine operating conditions, such as acceleration and deceleration, the greater amount of injected steam needed on acceleration is provided by the flexible wall accumulator 569 which acts as an acceleration pump, and the reduced amount of injected steam required by the engine on deceleration is provided by the resilient expansion of the flexible wall accumulator 569 which takes back the amount of water flowing through the orifice 605 and the water and steam in flash boiler 505 and feed lines 525 and 525A not needed by the engine on deceleration as indicated by the lower vacuum at the idle screw 509 on deceleration.

The fluidic drain valve 571 may be located on the upper part of the accumulator 569. In this event the fluidic drain valve 571 acts as a safety device to provide a fail safe system in the event that a float controlled valve 609 for the tank 603 does not operate properly. The float controlled valve 609 comprises a valve element which is normally positioned with respect to the lower end of the conduit 511 to maintain the level of water within the tank 603 at the level indicated in the drawing. The float control valve 609 includes an arm 611, a float 613 and a pivot or fulcrum 615. As the water level drops in the tank 603, the float 613 lowers and pivots the arm 611 about the fulcrum 613 to open the valve 609 and let water flow into the tank 603; and as the water level rises to the proper level as determined by the float 613, the valve 609 is shut off.

If the valve 609 and associated mechanism should malfunction, the fluidic drain valve 571 located at the top of the accumulator 569 will be opened by the head of water extending from the tank 503 to the fluidic drain valve 571 to prevent any flow of the water into the induction system of the engine.

As noted above, the fixed area orifice 605 may be replaced by a variable area orifice, and the variable area orifice may be controlled by changing engine temperatures, as described above with reference to the orifice 541 in FIG. 25.

In another embodiment of the present invention, fuel may be added to the fluid introduced to the flash boiler to form reaction products ahead of the engine cylinder. The desired reaction products are free hydrogen and carbon monoxide, and these products are readily formed by a reactor heated to temperatures of 900° C. or greater, which temperatures are easily obtained from the engine exhaust system.

In a specific embodiment of this form of the invention, as shown in FIG. 23, fuel is taken from a source, such as the engine fuel tank or the bowl in the carburetor (illustrated as 617 in FIG. 23) or other source and is conducted through a conduit 619 to a tank 621. The level of fuel in the tank 621 is regulated by a valve 623 under the action of a float 625 mounted on one end of an arm 627 which in turn is pivoted at its other end to a fulcrum 629. The float and valve structure is maintained at a given distance $H_F$ below the inlet to the flash boiler 505. The distance $H_F$ is enough greater than the distance $H_W$ that the static head for the fuel at the distance $H_F$ is equal to the static head for the distance $H_W$ of the water, and both of these static heads are either equal to or just slightly greater than the vacuum at the idle adjustment screw 509 at idle RPM. A conduit 631 conducts fuel from the tank 621 to a T-joint connection with the conduit 511A at the inlet end of the orifice 605. A proportioning orifice 633 is located in the conduit 631, and this proportioning orifice 633 is so related to the proportioning orifice 607 in the conduit 511A that the respective flow rates for the fuel in the conduit 631 and the water in the conduit 511A are regulated in the right proportions.

The mixed fuel and water flows through the orifice 605 and into the inlet of the flash boiler 505. In the flash boiler 505, the mixed fluid is heated to a temperature which produces precombustion reaction products such as free hydrogen and carbon monoxide, which greatly enhance combustion in the engine cylinders.

A hydrogen accumulator 635, preferably a resilient expandable storage container, is located at a high point between the outlet of the flash boiler and the idle adjustment screw 509 for accumulating generated hydrogen after the ignition to the engine has been switched off and while the remaining heat in the flash boiler continues to generate the hydrogen. Other high dome accumulator fixed chambers can be designed into the induction system to accomplish this same purpose.

This hydrogen accumulator 635 not only accumulates hydrogen after shutting off the engine for providing easier subsequent start-up of the engine, it also acts as an acceleration pump for injecting additional, accumulated hydrogen into the engine with increasing vacuum on engine acceleration.

The accumulator 635 will also accumulate a substantial amount of carbon monoxide in addition to the free hydrogen (the lightest gas) since carbon monoxide is also a relatively light gas.

In another form of the present invention, additives may be added to either the water storage tank 503 or to the tank 603 to produce desired precombustion reaction products. As an example of additives that can be added, ammonia could be added to either the tank 503 or the tank 603.

A preferred form of variable area orifice device for the FIG. 23 embodiment is the reactor apparatus shown in detail in FIG. 26 and indicated generally by the reference numeral 550.

In the FIG. 26 embodiment a variable area orifice 507 is provided between a valve seat 541 and a movable valve element 543. The movable valve element 543 is seated on one end of a wire or rod 545. The other end of the rod 545 is seated in a cap 637, welded or otherwise attached to a related end of a tube 547. The opposite end of the tube 547 is connected by a flare 549 to the body 519 of the reactor apparatus. The flared end 549 is held in place by a double cone member 639 having a conical surface at one end which engages the flare 549 and a conical surface at the other end which provides a seat for a flare 641 formed at one end of an intermediate tubular member 643. The other end of the tubular member extends adjacent to but is spaced from the cap 637, and the tubular member 643 is concentric with and spaced from the rod 545 so as to provide a first flow path on the inside of the tubular member 643 between the member 643 and the rod 545 and a second flow path on the outside of the tubular member 643 between the tubular member 643 and the control tube 547. These two flow paths make up the flash boiler 505 in the FIG. 26 embodiment.

A powder or a vapor deposit on porous alumina or a filament catalyst 645 such as nickel or platinum is preferably placed in the outer flow path for aiding in producing the precombustion reactions desired.

The flared end 641 is held against the conical seat provided by the member 639 by means of a threaded plug 647. The plug 647 has an inner bore 649 for providing a slide fit with one enlarged end of the movable valve element 543. As best illustrated in FIG. 27, this enlarged end of the valve element 543 has grooves 651 extending axially for permitting liquid flow from the variable area orifice formed between the valve seat 541 and the other end of the valve element 543 and to a passageway 653. The passageway 653 is connected to the upper end of the collapsible reservoir 569. The grooves 651 also connect with the inner flow passageway 505 extending between the intermediate tube 643 and the rod 545 so that these grooves admit the inflowing liquid to the inlet end of the flash boiler 505.

The reactor 550 shown in FIG. 26 is installed in the opening 538 of the exhaust manifold at an angle such that the longitudinal axis of the reactor is either horizontal or tilted slightly upward in a direction from the inlet 511A to the cap 637 at the opposite end of the reactor. This inclination of the longitudinal axis of the reactor in combination with the slight reduction in the diameter of the flow area between the outlet end of the grooves 651 and the inlet to the flash boiler 505 insures that the incoming fluid must first fill the collapsible reservoir 569 before it can flow to the flash boiler 505.

A spring 655 is seated between the enlarged end of the valve element 543 and a member 657 which provides the valve seat 541 at one end and which is also threaded within the inlet 511A to provide an adjustable seat for the spring 655.

The outlet products of the flash boiler 505 are conducted through openings 659 formed in the double conical member 639 and to a passageway 661 formed in the body 519 of the reactor. The passageway 661 connects with the conduit 525 leading to the idle adjustment screw 509.

Passageway 650 connects exhaust gas recess area 539 in body 519 to tube extension 652 to provide exhaust manifold exhaust total pressure for use in an inverter.

In the operation of the reactor shown in FIG. 26, incoming water flows into the reactor from the conduit 511A and incoming fuel flows into the reactor from the conduit 631. The mixed fluid then flows past the variable area orifice formed by the movable valve member 543 and the fixed valve seat 541, through the slots 651 and down the passageway 653 to fill the collapsible reservoir 569.

This occurs quickly on the initial start-up, and the collapsible reservoir is thereafter maintained in a filled condition in a variable container volume. The incoming fluid, as regulated by the opening of the variable area orifice, flows from the outlet into slots 651 to the inlet end of the concentric flash boiler 505 where it picks up heat. The flowing fluid flows along the rod 545 within the intermediate tube 643 until it reaches the outlet end of the tube 643. At this point the direction of flow of the fluid is reversed, and the fluid is caused to flow back along the outside of the intermediate 643 and through the openings 659 to the outlet conduit 525. The control tube 547 is made of a material having a coefficient of thermal expansion which is higher than that of the material of the rod 545 so that the tube 547 expands to a greater extent on an increase in temperature than does the rod 545, and this causes an increasing opening between the valve element 543 and the valve seat 541. This reactor thus provides a response to changing engine temperatures in substantially the same way as described above for the FIG. 25 embodiment in this respect.

The spring 655 provides an important control function in this embodiment of the present invention because the element 543 is not attached to the low coefficient of expansion control rod 545. Nor is the rod 545 attached to end plate 637 but is instead a snug slip fit at each end. Therefore, in order to provide means by which the variable area orifice will open up between 543 and 541, it is necessary to have a spring 655 to provide the continual axial load upon member 543 so that it will follow the relative expansion difference of control element 545 and the outer control tube 547. The differential expansion of these two members is the control that controls the opening of the variable area orifice. The system is normally factory preset to the normal operating temperatures of combustion in the exhaust manifolds for normal low speed idle conditions by, in the factory, first setting member 657 to seat against valve member 543 to the point of just reaching the point of valve closure as measured by a vacuum applied at 525. Second, upon reaching this point at controlled room temperature, the member 657 is rotated, in a factory setting, a given further amount representing the equivalent of a preset axial load between the members, thus preloading member 545 in relation to the outer tube structure 547 such as to give a preload equivalent to the preset temperature. In other words, as the members are heated up and the relative expansion occurs, it will result in the seat just being ready to open when it reaches idle standard temperature. It is, of course, possible to make a field adjustment if it were desired by adjusting 657 in the field, but it is not normally contemplated.

The collapsible reservoir 569 provides or serves as an acceleration pump on acceleration and as a collecting reservoir on deceleration in the same way as described above in detail with reference to FIG. 23 and other embodiments of this invention.

It should also be noted that this FIG. 26 embodiment provides an additional, beneficial control function as compared to other embodiments of the present invention, in that the FIG. 26 reactor provides a change in amount of fluid output flow in response to heat flux. That is, the FIG. 26 embodiment acts, somewhat like an over center switch arrangement, for tending to provide increasing flow rates on acceleration, in direct response to increased liquid flow into the flash boiler, and it tends to provide a greater reduction in delivered fluid flow on deceleration in direct response to the decreasing fluid flow into the reactor on deceleration conditions, as described in detail above.

To maximize this control function (the response to changes in fluid flow as well as and simultaneously with changes in heat flux) the tube 547 can be welded to the rod 545 (to thereby eliminate the need for the spring 655) and the tube 547 and rod 545 can be made of the same material.

As illustrated in FIG. 26, the fluid within the inner tube 643 is primarily or entirely water in a liquid state while the fluid between the tube 643 and the tube 547 is primarily or entirely steam in a gaseous state, and both of these fluids act as a barrier to the transfer of heat from the hot exhaust gases from the outside of the tube 547 through the fluids and to the rod 545.

This control method of providing a change in amount of fluid output flow in response to heat flux can be used to control the feeding of water or water plus additives to the engine instead of controlling the flow of steam.

The control members 545 and 547 can be made of the same material, rather than being made of two different materials having two different coefficients of thermal expansion; and it is in fact preferable in some applications to make these control members of the same material because doing so will provide a greater degree of overcenter type reaction to changes in heat flux to insure that the valve opens at the desired time and to insure also that the valve closes at the desired time under particular conditions of engine operation. When the control members 545 and 547 are made of the same material, a regenerative feedback effect is produced. This regenerative feedback is responsive to changes in fluid flow rates resulting from greater valve opening with increased fluid flow rates on increased heat flow rates and a greater valve closing with decreased fluid flow rates on decreased heat flow rates.

The heat flux control function is a true heat flux function which is not dependent on the thermal control feature of the valve or upon differences of coefficient of expansion of materials, and the heat flux control function is a very significant control function because of the rate of response and the magnitude or extent of response which it provides.

It should be noted also that this principle of control is not dependent upon the fluid being in a liquid state, but is instead operable also with the fluid in a gaseous state.

The FIG. 26 reactor structure can also be used in the FIG. 18 and FIG. 21 embodiments of the present invention.

A number of additives can be used with the present invention. These additives include additives for increasing the combustion efficiency, such as ammonia and hydrogen peroxide and solutions of hydrogen gas as well as soluble hydrocarbons. The additives can also include additives for reducing the hardness of the water and resulting problems of deposit build-up in the conduits of the system.

The additives may also include upper cylinder lubricants and carbon and lead deposit removers and detergents for cleaning the engine.

Water soluble fuel may also be added to the fluid in the water storage tank.

The idle adjustment screw 509 shown in FIG. 24 is formed with a resonating chamber 577 at the inner end of the idle adjusting screw. This resonating chamber 577 is formed by putting a dimple 579 in the lower surface (as viewed in FIG. 24) of the inner end of the screw and forming an orifice 580 at slotted opening 581 in the upper surface of the inner end of the screw adjacent and first forward of the dimple 579. The incoming steam flowing through the hollow interior and orifice 580 of the screw 509 and out the opening 581 thus causes the opening 581 and the chamber 577 to act as a whistle in which the chamber 577 provides a resonant effect for producing ultrasonic vibrations and wave fronts in the steam flowing out of the opening 581. This has a beneficial effect in enhancing the intermixing of the injected steam with the fuel/air mixture flowing through the carburetor at this point. This resonating effect also adds energy to the reaction and is another way to add energy to the system. The resonating frequency is preferably adjusted and matched to the size of fuel droplets in the incoming fuel/air mixture to shatter these fuel droplets and vaporize the liquid fuel for better mixing and combustion.

It is believed that this ultrasonic injection of the steam contributes to precombustion reaction of the fuel/air mixture with the steam for enhancing the formation of free hydrogen and carbon monoxide.

As illustrated in FIG. 24, the idle adjustment screw 509 may preferably have a variable orifice air bleed structure 583 incorporated with the idle adjustment screw 509. The air bleed 583 includes an opening 585 for the inflow of atmospheric air. This opening 585 is closed by a ball check valve 587 under the bias of a spring 589 seated on a spring retainer seat 591. The force of the spring 589 is matched to the engine intake vacuum produced at the idle adjustment screw location so that additional lean-out air is introduced as desired.

The spring retainer 591 may also preferably have an orifice 593 for providing additional control over the amount of lean-out air introduced into the idle adjustment screw 509.

The flexible seal hose 595 supports and seals the structure 583 to the idle screw 509. The seal 595 can be rotated by the fingers relative to the structure 583 to rotate the idle screw 509 as required for the idle screw 509 adjustment. A contrasting colored longitudinal index line or ridge 597 is provided on the surface of the seal 595. With the idle screw 509 seated, the seal 595 is adjusted so that the index mark 597 is vertical for reference, and this index mark 597 is then used to make accurate, synchronized adjustments when two idle screws are used as in FIG. 21. Alternatively, an adjustable split index ring 599 having a split 601 may be used for the index function.

The vacuum in the inlet manifold of the engine at idle is a maximum and progressively decreases with increasing throttle opening as illustrated by the solid line in FIG. 22.

The present invention takes advantage of this relationship of the vacuum within the inlet manifold to produce an inverted relationship between the vacuum at the outlet end of the fluid injection apparatus so that the vacuum at the outlet end of the fluid injection apparatus goes from zero at closed throttle to a maximum at full throttle as shown by the line labeled "Inverter Line" in FIG. 22.

The term "vacuum" as used herein has been used to refer to the difference in pressure between the pressure existing at the outlet end of the steam injection apparatus and the pressure normally existing (ambient atmospheric pressure) over the fluid in the storage tank 503. As will be described in more detail below, the pressure over the fluid in the storage tank 503 may be increased above normal atmosphere, as by introducing engine exhaust pressure, and in this event the term "vacuum" will be used to indicate the difference between the pressure existing at the outlet end of the fluid injection apparatus and the super atmospheric pressure existing over the fluid in the storage tank.

In accordance with the present invention, the engine vacuum existing below the butterfly of the carburetor, such as in the intake manifold, can also be used to control the amount of fluid (steam or water) inducted into the engine induction system even though the vacuum within the manifold and beyond the carburetor varies in a manner directly opposite the generally desired relationship of increasing vacuum with increasing throttle opening as described above.

Another embodiment of an injector assembly for injecting fluid at the idle screw opening is illustrated in FIG. 28 and is indicated generally by the reference numeral 751.

The injector assembly 751 comprises an injector tube 753 which corresponds generally to the tube 509 shown in FIG. 24, but the injector assembly shown in FIG. 28 has a separate threaded sleeve 755 which can be adjustably positioned with respect to the injector tube 753 in the initial installation to compensate for different thread requirements and different carburetor port constructions from car-to-car. For example, some cars will require U.S. type threads while other cars will require metric type threads, and the injector assembly shown in FIG. 28 permits one injector tube 753 to be used in both cases. Also, by way of further example, some automobiles will have the port structure positioned at a location different from the port structure of other cars, and the injector assembly shown in FIG. 28 permits the initial position of the inner ends of the threaded sleeve 755 to be varied with respect to the position of the injector tube 753 to accommodate for this difference in location of the port structure.

In the initial installation of the injector assembly 751, the threaded sleeve 755 is threaded into the carburetor and rotated to a position where the inner ends of the threads on the sleeve 755 are positioned properly with respect to the internal port structure of the carburetor.

The injector tube 753 is then inserted axially through the interior of the threaded sleeve 755 until the conical surface 757 on the inner end of the injector tube 753 seats in the idle screw port, or related opening, in the carburetor. At this point the orifice 581 of the injector tube 753 is properly located with respect to the inner end of the threaded sleeve 755, and the injector tube 753 and the sleeve 755 are locked together in this relative position of the two parts. The two parts can be locked and sealed together by a swaging nut 759 as illustrated in FIG. 28 or other locking methods, such as the use of a lock tight compound, can be used. A swaging tool can be used in some cases.

An indicator sleeve 595 having an indexing mark 597 (as in the FIG. 24 embodiment) is then slipped over the outer end of the injector tube 753, and the injector assembly can be rotated, as an assembly, to the desired position in the carburetor idle screw location by noting the number of turns of the indicator mark 597.

The indicator mark 597 also permits two or more of the injector assemblies 751 to be rotated in synchronism in cars which have two or more barrels in the carburetor.

The indexing mark 759 is quite important when synchronizing the adjustments of two or more injector assemblies 751 in cars having two or four barrel carburetors because each injector assembly 751 can be rotated, say a ¼ of a turn, and the resulting change in exhaust emissions can then be read out on the test instruments. All assemblies can be kept synchronized throughout the adjustment, merely by visually noting the relative positions of the indexing marks 759.

The two part injector assembly 751 shown in FIG. 28 thus permits a single injector tube 753 to be used for all makes of cars, regardless of the type of thread and regardless of the differences of location of the internal port structure.

Another embodiment of an emission control system constructed in accordance with the present invention is illustrated in FIG. 29 and is indicated generally by the reference numeral 761.

Many of the component parts of the system 761 shown in FIG. 29 correspond to component parts earlier described in other views of the drawings, and the same reference numerals have therefore been used in FIG. 29 to denote those component parts which are the same as component parts illustrated in the other drawing views.

Thus, an emission control system 761 shown in FIG. 29 comprises a water storage tank 503. The water is conducted from the water supply tank 503 to a variable orifice control valve 507 by a supply line 511.

The flow area through the control orifice 507 is varied in response to the temperature of the exhaust gases in exhaust pipe 521, and the structure and mode of operation of the variable flow control orifice 507 is essentially the same as that illustrated and described with reference to FIG. 25.

The variable flow control orifice 507 and related structure is constructed as a subassembly which can be screwed into the exhaust pipe 521 by the threads 538 as a subassembly of the emission control system 761. The thermal response is obtained by the difference in coefficients of thermal expansion between an outer tube 547 and an inner rod 545 (not illustrated in FIG. 29 but shown in FIG. 25).

As the temperature of the exhaust gases increases, the outer tube expands more than the inner rod and moves a valve element 543 away from a valve seat 541 to increase the size of the flow passageway, all as illustrated and described above in reference to FIG. 25.

The fluid then flows from the conduit 511, through the orifice 507 and into a conduit 513.

In this case it should be noted that the fluid passes through the flow control orifice 507 and into the conduit 513 as a liquid because there is no flash boiler in the emission control system 761 as shown in FIG. 29. However, there is a significant amount of heat transfer from the structural parts of the flow control orifice 507 to the liquid passing through this orifice because of the high heat conductivity of these parts. The molybdenum wire 545 (see FIG. 25) in particular transfers a considerable amount of heat to the liquid passing through the flow control orifice 507.

As noted above, since there is no flash boiler in the FIG. 29 embodiment, the liquid in the line 511 is not converted to steam in the line 513 but is instead retained as a liquid. Even in the applications illustrated and described above which do incorporate a flash boiler (for example, the FIGS. 18, 21, and 23 embodiments) it has been found desirable, in some applications, to use the flash boiler only for adding heat to the liquid but not to add enough heat to change the liquid to steam. In such applications the flash boiler 505 is constructed and located in a way such that the liquid is not converted or substantially converted to vapor in the conduit 513 or in the related structure up to the point of injection into the engine. This has an advantage in that the control of the fluid flow and related structure can be made simpler and more compact when regulating the flow of liquid than can be the case when the flow to be regulated is steam or substantially steam.

With the amount of heat that is added to the fluid (by the structure of the orifice 507 alone or structure of that orifice in combination with the flash boiler) the liquid temperature is raised sufficiently so that the injected liquid is rapidly transformed into vapor at the lower pressure existing in the induction system of the engine. That is, it is believed that the heated liquid pretty much instantaneously flashes into a vapor immediately after being injected into the engine induction system with all those embodiments of the present invention which do not actually convert the liquid to steam before injection into the engine.

The conduit 513 in the FIG. 29 embodiment is connected to a fluidic drain valve 571 by a T-connection 763, and the conduit 513 is preferably shaped in a coil 575 around the outside of the fluidic drain valve 571 as illustrated in FIG. 29.

The outlet end of the coil 575 extends upward, as a continuation of the conduit 513, to a flexible walled accumulator 569, and the conduit 513 includes an upper end part 765 which is disposed axially within the accumulator 569. The part 765 has an end 767 which extends up to within about one inch of the top part of the accumulator to leave a small space within this part of the accumulator. The space acts as a void on deceleration.

As illustrated in FIG. 29, the vertical distance D between the open upper end 767 of the tube part 765 and the upper tip 571 of the fluidic drain valve is made equal in static head to the vacuum existing at the idle screw opening 509 when the engine is running at idle. The coil 575 can be extended or compressed to make fine adjustments in the vertical location of the tip 571.

When the vacuum at the idle screw 509 is the vacuum at idle or less (such as on deceleration) the vacuum exerted on the line 513 is not sufficient to draw fluid from the open upper end 767 of the tube 765 and through the conduit 525 and injector assembly 751 into the engine. Instead, there is a void in the upper part of the accumulator 569 above the open upper end 767 and no fluid flows into the engine.

As the vacuum at the idle screw opening 509 increases with increasing engine throttle opening (see FIG. 22) the increasing vacuum is transmitted to the interior of the flexible walled accumulator 569, causing the accumulator to immediately constrict. This forces the liquid previously stored in the accumulator (below the level of the tip 767) to be squeezed upward and into the conduit 525 and through the injector assembly 751 into the engine. At the same time, the thermal control valve 507 begins to open (because of the increasing heat in the exhaust pipe 521), and the vacuum transmitted from the idle screw opening 509 back through the injector assembly 751, conduit 525, flexible accumulator 569, conduit 513 and conduit 511 draws water from the water storage tank 503 to continue to produce a continued flow of liquid to and through the injector assembly 751.

Thus, while the thermal control valve 507 is usually set to be closed at idle, the flexible walled accumulator 569 functions to immediately supply the needed fluid to the engine on acceleration, even though the thermal control valve 507 is at that point in time still closed. The response of the thermal control valve 507 is very quick, however, and the valve 507 opens up almost immediately on acceleration to permit the continued flow of liquid as described above.

On deceleration, the throttle is closed, and the vacuum at the opening 509 drops off to a level below that required to draw fluid from the level of the point 767 in the flexible walled accumulator 569. The stored energy of the resilient walls of the accumulator 569 also causes these walls to flex outward (after being pressed inward by the vacuum condition existing at acceleration or steady state operation). This distension of the walls of the accumulator provides a very fast response for sucking all liquid out of the conduit 529 and the injector assembly 751 above the accumulator 569.

The action of the thermal control valve 507 on deceleration is somewhat slower than that of the flexible walled accumulator 569. The thermal control valve 507 tends to remain open for a short period of time on deceleration because of the inherent mass of the structure and heat soak in the engine exhaust system on deceleration. In this event the fluidic drain valve 571 opens to permit any excess flow of fluid passing through the thermal control valve 507 to drain off through the open upper tip 571 rather than being fed by siphoning action into the idle screw opening 509 of the engine which is, as illustrated, somewhat lower than the effective intake level (the upper surface of the liquid in the storage tank 503) of the conduit 511.

The combination of the flexible walled accumulator 569 and the fluidic drain valve 571 provides a very fast responding discrimination between varying engine operating conditions to help modulate the correct amount of fluid to the engine, while the thermal control valve 507 serves as a basic regulating or monitoring device for controlling the flow to the engine, particularly under steady state operating conditions.

The emission control system shown in FIG. 29 has proven to be a very cost effective system for supplying an amount of fluid in response to the engine's need for the fluid. While the system shown in FIG. 29 does not realize all of the optimum benefits that can be achieved with other embodiments of the present invention described above, such as, for example, the system using the reactor apparatus shown in FIG. 26 for producing precombustion reaction products, the FIG. 29 system does provide a highly effective system for controlling the flow of fluid to the engine to reduce emissions and to improve economy with a construction that is quite simple to manufacture and to install and that is, as noted above, very cost effective.

While not illustrated in FIG. 29, the emission control system 761 can incorporate an air lean-out mechanism, such as the air lean-out valve 709 illustrated in FIG. 18 in association with the PCV valve 670 and related line for providing additional air lean-out under certain conditions of engine operation.

Furthermore, the feed arrangement illustrated in FIG. 29 wherein the basic regulating or monitoring valve 507 and conduit 513 feeds the fluid to the bottom of the discriminator combination (the fluidic drain valve 571 and the flexible walled accumulator 569) can be incorporated in the FIGS. 18 and 21 embodiments.

Thus, all of the embodiments of the present invention supply the inducted aqueous fluid (whether steam or steam plus water particles or steam plus precombustion reaction products or water alone or water plus additives) in amounts which vary in response to the engine's need for these materials at the varying conditions of engine operation. The engine needs different amounts of fluid (in the case of steam both in quantity and quality) to provide the desired reduction in emissions, and increased efficiencies of engine operation at varying conditions of operation of the engine. Thus, the engine's need for fluid at any particular condition of operation is dependent on the amount of fluid which will produce the best engine operation at that condition. The best engine operation includes obtaining complete lean, clean combustion with lowest emissions of HC, CO and NOX and best fuel economy without detonation, preignition or after-fire (dieseling). The engine need for fluid varies widely from no fluid at all under certain conditions of operation to amounts of fluid flow in the same order of magnitude of fuel flow at other conditions of engine operation. The engine's need for fluid is zero at engine shut-off as no water can be permitted to flow into the engine when shut-off. If the water flow into the engine were to be permitted at shut-off, corrosion and/or liquid lock will occur. At normal steady state low speed idle only a trace amount of fluid or no fluid at all is required to give optimum low idle emissions. Increasing quantities of fluid proportionate to power are required as engine power is increased at each steady state point. Under dynamic conditions, for example, acceleration at high BMEP, an extra amount of fluid is required over and above operation at a steady state condition; and, in the case of steam, the steam should be of a lower quality, that is, with a certain percentage of water droplets carried with the steam in order to give maximum combustion cooling, to keep the nitroux oxide emissions within satisfactory limits. On deceleration, less fluid is required at each point in the deceleration, than would be desired for operation at steady state at any of those points.

Providing satisfactory precombustion reaction is another significant point in determining the engine's need for steam. By providing a proper amount of steam at a proper temperature for any particular conditions of engine operation, the desired precombustion reactions can be maximized and this maximization enhances engine performance. It improves the quality of combustion and therefore lowers the emissions and it improves engine efficiency and economy and engine cleanliness.

The engine's need for fluid is also determined by limiting the fluid to an amount that will not hurt combustion. For instance, in deceleration if fluid is not limited, too much fluid can be introduced to cause the combustion to be poor.

This will produce incomplete combustion. It will cool the flame sufficiently that undesirable amounts of HC and CO will be produced. Engine efficiency can be seriously impaired. Hydrocarbon deposits also increase.

On acceleration, the engine's need for fluid is dependent on introducing the right amount of fluid to absorb (by its high specific heat; plus latent heat of vaporization of water droplets included with the steam; plus heat of dissociation) excess engine heat generation, which would otherwise go toward producing high combustion and surface peak temperatures and peak pressures at about top dead center (but this still must be done without introducing too much fluid so as to impair combustion with the undesirable effects noted above). By introducing the right amount of additional fluid, the energy is absorbed in energy in steam which is given back within the latter part of the cycle as expansion of the steam adding smoothly at favorable crank angle to the power stroke and torque of the engine. The right amount of additional fluid at this point therefore prevents hot spots and smooths the pressure and temperature energy conversion. Also, the right amount of fluid needs to be introduced to provide for engine cleanliness. The right amount of fluid will provide both clean combustion and removal of engine deposits. Further, it is needed to inject the right amount of fluid in order to heat and thereby vaporize the fuel to get fuel-air ratio distribution and mass distribution between the cylinders. This gives maximum economy and lowest emissions. The present invention provides the amount of fluid in response to engine's need for fluid under all of these various conditions of engine operation by regulating the amount of fluid in response to one or more conditions of engine operation as described in detail above.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for providing improved combustion and reduced emissions in an internal combustion engine, having a combustion zone and an exhaust, comprising
feeding both fuel and controlled amounts of steam into said combustion zone via an ultrasonic generator and subjecting it there to ultrasonic treatment, and
in response to engine needs, increasing the weight ratio of said aqueous fluid to said fuel during engine acceleration.

2. The method of claim 1 wherein the steam is injected in a carburetor passageway just downstream of the throat and acts on the boundary layer of the fuel-air mixture flowing through the passageway as a fluidic amplifier to cause sweeping of the mixture flow across the passageway in resonance with the shock waves produced by the injected steam.

3. The method of claim 1 including reforming a part of the injected steam by a catalyst to produce hydrogen gas and feeding the hydrogen gas to said combustion zone.

4. The method of claim 1 including reforming part of the fuel hydrocarbons by a catalyst to produce hydrogen gas and feeding the hydrogen gas to said combustion zone.

5. A method of improving a combustion process of the kind in which a fuel is mixed with air and vaporized and then burned in a combustion chamber of an engine, said method comprising,
injecting steam into the combustion chamber and including adding ultrasonic energy to the steam injected into the combustion chamber, and
controlling the amount of fluid injected in response to a condition of the combustion,
including increasing the flow rate of fluid to the combustion chamber with increasing heat generation in the combustion chamber.

6. A method as defined in claim 5 wherein the ultrasonic energy is produced by injecting the steam through a small orifice.

7. A method as defined in claim 5 wherein the ultrasonic energy is produced by mechanical means acting on the flow of steam.

8. A method as defined in claim 5 wherein the ultrasonic energy is produced by transmitting the steam through a whistle.

9. Apparatus for providing improved combustion and reduced emissions in an internal combustion process engine comprising the combination of
a combustion chamber,
means for feeding fuel into said combustion chamber,
means for injecting controlled amounts of steam into said combustion chamber and including ultrasonic injector means for adding ultrasonic energy to the injected steam,
and
means in response to engine need for increasing the weight ratio of said aqueous fluid to said fuel during engine acceleration.

* * * * *